US009677636B2

(12) United States Patent
Nakamura et al.

(10) Patent No.: US 9,677,636 B2
(45) Date of Patent: Jun. 13, 2017

(54) ANTI-VIBRATION RUBBER MEMBER AND PRODUCTION METHOD THEREOF

(71) Applicants: SUMITOMO RIKO COMPANY LIMITED, Aichi-ken (JP); STT INC., Kanagawa-ken (JP)

(72) Inventors: Yorikazu Nakamura, Aichi-ken (JP); Hiroyuki Matsumura, Aichi-ken (JP); Takahisa Suzuki, Kanagawa-ken (JP)

(73) Assignees: SUMITOMO RIKO COMPANY LIMITED, Aichi-Ken (JP); STT INC., Kanagawa-Ken (JP)

( * ) Notice: Subject to any disclaimer, the term of this patent is extended or adjusted under 35 U.S.C. 154(b) by 84 days.

(21) Appl. No.: 14/636,339

(22) Filed: Mar. 3, 2015

(65) Prior Publication Data

US 2015/0167767 A1 Jun. 18, 2015

Related U.S. Application Data

(63) Continuation of application No. PCT/JP2013/073960, filed on Sep. 5, 2013.

(30) Foreign Application Priority Data

Sep. 21, 2012 (JP) ................................. 2012-208169

(51) Int. Cl.
*F16F 1/36* (2006.01)
*C10M 143/02* (2006.01)
(Continued)

(52) U.S. Cl.
CPC ............ *F16F 1/3605* (2013.01); *B05D 3/002* (2013.01); *B05D 3/0254* (2013.01); *B05D 5/086* (2013.01);
(Continued)

(58) Field of Classification Search
CPC ......... F16F 1/3605; F16F 1/38; F16C 33/104; B05D 3/0254; B05D 3/002; B05D 5/086; B60G 11/22
(Continued)

(56) References Cited

U.S. PATENT DOCUMENTS 4,880,318 A * 11/1989 Shibahara .......... B60G 21/0551
384/125
4,916,749 A * 4/1990 Urban ................ B60G 21/0551
384/125
(Continued)

FOREIGN PATENT DOCUMENTS

JP 2-121814 5/1990
JP 2003-26851 1/2003
(Continued)

OTHER PUBLICATIONS

Office Action issued in Japan Patent Appl. No. 2012-208169, dated Jan. 5, 2016, along with an English translation thereof.
(Continued)

*Primary Examiner* — Thomas Irvin
(74) *Attorney, Agent, or Firm* — Greenblum & Bernstein, P.L.C.

(57) ABSTRACT

An anti-vibration rubber member includes: a rubber elastic body that is made of a self-lubricating rubber containing an elastomer and a bleeding lubricant; a coating film that covers at least a portion of a sliding inner surface that is a surface of the rubber elastic body disposed on an inner side of a sliding surface, contains a resin having a mercapto group and a solid lubricant containing polytetrafluoroethylene particles and ultrahigh molecular weight polyethylene particles, and is deformable to follow up deformation of the rubber elastic body; and a lubricating film that covers at least a portion of a surface of the coating film, is formed by including the bleeding lubricant having penetrated the coat-
(Continued)

ing film from the rubber elastic body and oozing onto the surface of the coating film, and forms at least a portion of the sliding surface.

5 Claims, 21 Drawing Sheets

(51) Int. Cl.
    *C10M 147/02* (2006.01)
    *F16F 7/00* (2006.01)
    *B60G 7/00* (2006.01)
    *B60G 7/02* (2006.01)
    *B05D 3/00* (2006.01)
    *B05D 3/02* (2006.01)
    *B05D 5/08* (2006.01)
    *F16F 1/38* (2006.01)

(52) U.S. Cl.
    CPC ............... *B60G 7/005* (2013.01); *B60G 7/02* (2013.01); *C10M 143/02* (2013.01); *C10M 147/02* (2013.01); *F16F 1/38* (2013.01); *F16F 7/00* (2013.01); *B60G 2204/143* (2013.01); *B60G 2204/41042* (2013.01)

(58) Field of Classification Search
    USPC ......... 267/292, 293, 140, 140.3, 140.4, 141; 184/5.1, 23; 384/902, 322, 300
    See application file for complete search history.

(56) References Cited

U.S. PATENT DOCUMENTS

| | | | | |
|---|---|---|---|---|
| 5,762,423 A | * | 6/1998 | Mori | .................... C10M 107/02 384/279 |
| 5,984,283 A | * | 11/1999 | Tsuiki | .................... B60G 11/16 267/140.3 |
| 6,241,393 B1 | * | 6/2001 | Georges | ................ F16C 33/102 384/130 |
| 6,467,961 B2 | * | 10/2002 | Nakamaru | ......... C08G 59/3254 384/13 |
| 6,474,631 B2 | * | 11/2002 | Hadano | .............. B60G 21/0551 267/140.3 |
| 6,569,816 B2 | * | 5/2003 | Oohira | ................. C10M 103/06 508/100 |
| 9,033,320 B2 | * | 5/2015 | Nakamura | ................ F16F 1/38 267/140.3 |
| 2011/0031664 A1 | | 2/2011 | Nakamura et al. | |
| 2011/0170814 A1 | | 7/2011 | Nakamura et al. | |

FOREIGN PATENT DOCUMENTS

| | | |
|---|---|---|
| JP | 2006-2016 | 1/2006 |
| JP | 2006-002016 | 5/2006 |
| JP | 2007-255635 | 4/2007 |
| JP | 2007-170454 | 5/2007 |
| JP | 2007-170454 | 7/2007 |
| JP | 2007-255635 | 10/2007 |
| WO | 2010/038746 | 4/2010 |
| WO | 2010/038749 | 4/2010 |

OTHER PUBLICATIONS

International Search Report from PCT/JP2013/073960, mailed Oct. 8, 2013.

English translation of the International Preliminary Report on Patentability from PCT/JP2013/073960, issued Mar. 24, 2015.

* cited by examiner

ANTI-VIBRATION RUBBER MEMBER AND PRODUCTION METHOD THEREOF

CLAIM FOR PRIORITY

This application is a Continuation of PCT/JP2013/073960 filed Sep. 5, 2013, and claims the priority benefit of Japanese application 2012-208169, filed Sep. 21, 2012, the contents of which is expressly incorporated by reference herein in its entirety.

TECHNICAL FIELD

The present invention relates to an anti-vibration rubber member that is in sliding contact with a mating member that vibrates relative to the anti-vibration rubber member, and to a production method thereof.

BACKGROUND ART

A stabilizer bushing is an example of an anti-vibration rubber member. The stabilizer bushing is fixed to a vehicle body through a bracket. A stabilizer bar is disposed in a holding hole of the stabilizer bushing.

For example, during turning of the vehicle, a centrifugal force causes the outer wheel side of the suspension to sink downward while the inner wheel side elongates. This twists the stabilizer bar. Utilizing an elastic restoring force against such torsion, the stabilizer bar works to lift up the outer wheel side of the suspension. Thus, the stabilizer bar maintains the vehicle horizontal.

When the stabilizer bar is twisted or when the twisted stabilizer bar recovers due to the elastic restoring force, the stabilizer bar outer circumferential surface and the stabilizer bushing inner circumferential surface slide relative to one another. Higher friction resistance during such sliding may cause more abnormal noise (what is called a stick slip noise). Higher friction resistance during such sliding may also reduce the riding comfort of the vehicle.

In view of these points, a liner made of polytetrafluoroethylene (PTFE) with a small friction coefficient is conventionally inserted into a holding hole. The inner circumferential surface of the liner is then brought in sliding contact with the outer circumferential surface of the stabilizer bar. However, the PTFE liner is relatively expensive. Therefore, if the PTFE liner is used, the cost of producing the stabilizer bushing increases.

Hence, stabilizer bushings that do not require a PTFE liner have been developed. For example, Patent Documents 1 and 2 describe a stabilizer bushing that has a rubber elastic body made of a self-lubricating rubber, a coating film, and a lubricating film. A holding hole is formed on the radially inner side of the rubber elastic body. A stabilizer bar is disposed in the holding hole. The coating film covers the inner circumferential surface of the holding hole. A bleeding lubricant included in the self-lubricating rubber penetrates the coating film and oozes onto the surface of the coating film to form the lubricating film. The lubricating film is in sliding contact with the stabilizer bar. In the case where the lubricating film is insufficient on a portion, the coating film containing the bleeding lubricant is exposed from this portion and comes into sliding contact with the stabilizer bar. According to the stabilizer bushing described in Patent Documents 1 and 2, primarily the lubricating film and supplementarily the coating film are in sliding contact with the stabilizer bar. Consequently, the friction resistance between the stabilizer bushing and the stabilizer bar is reduced.

RELATED ART DOCUMENTS

Patent Documents

Patent Document 1: International Patent Application Publication No. 2010/038746 (WO 2010/038746)
Patent Document 2: International Patent Application Publication No. 2010/038749 (WO 2010/038749)
Patent Document 3: Japanese Patent Application Publication No. H2-121814 (JP H2-121814 A)
Patent Document 4: Japanese Patent Application Publication No. 2003-26851 (JP 2003-26851 A)

SUMMARY OF THE INVENTION

Problem to be Solved by the Invention

In the stabilizer bushing described in Patent Documents 1 and 2, polytetrafluoroethylene particles are mixed in a coating film as a solid lubricant. By containing the polytetrafluoroethylene particles having small friction coefficients, the friction resistance of the coating film to the stabilizer bar can be reduced. Thus, even in the case where the lubricating film is insufficient on a portion, the friction resistance of the coating film to the stabilizer bar can be reduced. However, the coating film is gradually worn when it is in sliding contact with the stabilizer bar. In the stabilizer bushing described in Patent Documents 1 and 2, the wear resistance of the coating film is not sufficient. As the coating film is proceeded to be worn, the rubber elastic body may be exposed. Accordingly, the friction resistance between the stabilizer bushing and the stabilizer bar is increased.

An anti-vibration rubber member and a production method thereof according to the present invention have been accomplished in view of the foregoing problems. Thus, it is an object of the present invention to provide an anti-vibration rubber member that has low friction resistance to a mating member and includes a coating film having high wear resistance, and a relatively simple production method thereof.

Means for Solving the Problem (1) In order to solve the above problem, an anti-vibration rubber member according to the present invention absorbs at least a portion of vibration of a mating member and has a sliding surface that is relatively in sliding contact with the mating member. The anti-vibration rubber member is characterized by including: a rubber elastic body that is made of a self-lubricating rubber containing an elastomer and a bleeding lubricant; a coating film that covers at least a portion of a sliding inner surface that is a surface of the rubber elastic body disposed on an inner side of the sliding surface, contains a resin having at least one functional group selected from a mercapto group, a vinyl group, an epoxy group, a methacryloxy group, and an amino group, and a solid lubricant containing polytetrafluoroethylene particles and ultrahigh molecular weight polyethylene particles, and is deformable to follow up deformation of the rubber elastic body; and a lubricating film that covers at least a portion of a surface of the coating film, is formed by including the bleeding lubricant having penetrated the coating film from the rubber elastic body and oozing onto the surface of the coating film, and forms at least a portion of the sliding surface.

The anti-vibration rubber member of the present invention includes the rubber elastic body, the coating film, and the lubricating film. The coating film includes the solid lubricant containing polytetrafluoroethylene particles and ultrahigh molecular weight polyethylene particles. By containing the ultrahigh molecular weight polyethylene particles, the coating film provides the good wear resistance.

For example, Patent Document 3 discloses a rubber molded product having a thin resin layer including ultrahigh molecular weight polyethylene. Further, Patent Document 4 discloses a molded body in which ultrahigh molecular weight polyethylene is used. As described in these Patent Documents, the ultrahigh molecular weight polyethylene provides good wear resistance. However, if the coating film of the anti-vibration rubber member according to the present invention contains only the ultrahigh molecular weight polyethylene particles, the coating film has a larger friction resistance to a mating member. Thus, when the coating film contains only the ultrahigh molecular weight polyethylene particles, the coating film does not provide desired slidability. Accordingly, the coating film of the anti-vibration rubber member according to the present invention contains polytetrafluoroethylene particles in addition to the ultrahigh molecular weight polyethylene particles. Among the solid lubricants, the polytetrafluoroethylene particles have a particularly small friction resistance. Therefore, by containing both of the polytetrafluoroethylene particles and the ultrahigh molecular weight polyethylene particles, the wear resistance of the coating film can be improved, while keeping the friction resistance of the coating film to the mating member small.

The lubricating film is formed by including the bleeding lubricant having penetrated the coating film from the rubber elastic body and oozing onto the surface of the coating film. That is, the lubricating film may be formed from only the bleeding lubricant oozed out of the rubber elastic body, and may be formed by including not only the bleeding lubricant but also other lubricating components. Although described in detail later, a bleeding lubricant (that may be the same as or different from the bleeding lubricant component in the rubber elastic body) may be compounded in the coating material for forming the coating film in order to form minute holes in the coating film. The bleeding lubricant in the coating material is released from the coating material when baked, and oozes onto the surface of the coating film that is being cured. In this case, the lubricating film is formed from both the bleeding lubricant having penetrated the coating film from the rubber elastic body and oozing onto the surface of the coating film, and the bleeding lubricant released from the coating material.

(2) In the configuration of (1) above, the ultrahigh molecular weight polyethylene particles preferably have an average particle diameter of 1 μm to 30 μm.

In the case where the particle diameter of the ultrahigh molecular weight polyethylene particle is small, a larger amount of the ultrahigh molecular weight polyethylene particles needs to be mixed to achieve the desired wear resistance. In this case, an amount of resin, which serves as a binder to the ultrahigh molecular weight polyethylene particles, is small, and thus adhesion between the coating film and the rubber elastic body decreases. As a result, the coating film may separate from the rubber elastic body. In contrast, in the case where the particle diameter of the ultrahigh molecular weight polyethylene particle is large, a use as coating material is difficult. Moreover, when a coating film having a thickness of about 5 μm to 30 μm is formed, a particle diameter larger than the film thickness results in a largely uneven coating film. In addition, the particles tend to be fallen out. In the present configuration, therefore, an average particle diameter of the ultrahigh molecular weight polyethylene particles is defined as 1 μm to 30 μm. With the same reason, an average particle diameter of the polytetrafluoroethylene particles is preferably 0.5 μm to 30 μm.

(3) In the configuration of (1) or (2) above, the coating film preferably contains 10 parts by mass to 70 parts by mass of the solid lubricant per 100 parts by mass of the resin.

The reason for containing 10 parts by mass or more of the solid lubricant is that less than 10 parts by mass of the solid lubricant does not achieve the desired wear resistance. In contrast, the reason for containing 70 parts by mass or less of the solid lubricant is that more than 70 parts by mass of the solid lubricant reduces an amount of the resin, which serves as a binder, is small with respect to the solid lubricant, and thus adhesion between the coating film and the rubber elastic body decreases, resulting in easy separation of the coating film. Another reason is that the solid lubricant itself may provide resistance to increase friction resistance of the coating film. According to the present configuration, separation of the coating film is suppressed, while the friction resistance of the coating film to the mating member is reduced to improve wear resistance of the coating film.

(4) In the configuration of any of (1) to (3) above, the percentage of the ultrahigh molecular weight polyethylene particles contained in the solid lubricant is preferably 10% by mass to 90% by mass when the total of the solid lubricant is defined as 100% by mass. It is more preferable if the percentage is 30% by mass to 80% by mass.

The polytetrafluoroethylene particles serve mainly to reduce friction resistance of the coating film. Although the ultrahigh molecular weight polyethylene particles are self-lubricating, they serve mainly to improve wear resistance of the coating film. According to the present configuration, the coating film can satisfactory achieve both of the friction resistance and the wear resistance.

(5) In the configuration of any of (1) to (4) above, the coating film preferably has a plurality of minute holes in which the bleeding lubricant oozed out of the rubber elastic body is capable of being reserved.

In the stabilizer bushing described in Patent Documents 1 and 2, when the temperature is raised during use or the like, the bleeding lubricant in the self-lubricating rubber becomes easily soluble. Thus, the bleeding lubricant oozes onto the surface of the rubber elastic body faster, which increases the amount of the bleeding lubricating oil which oozes out. If the amount of the bleeding lubricating oil which oozes out becomes larger than the amount of bleeding lubricating oil that can penetrate the coating film, the excessive amount of bleeding lubricating oil accumulates at the interface between the coating film and the rubber elastic body. If this happens, the bleeding lubricating oil accumulating at the interface may push up the coating film and may separate the coating film from the rubber elastic body even if the rubber elastic body and the coating film are initially strongly joined to each other. If the coating film is separated, the friction resistance between the stabilizer bushing and the stabilizer bar (mating member) may be increased.

On this point, in the present configuration, the coating film has a plurality of minute holes that can reserve the bleeding lubricant oozed out of the rubber elastic body. Thus, even if the bleeding lubricant in the self-lubricating rubber oozes out faster than the bleeding lubricant penetrates the coating film at a high temperature and all of the bleeding lubricant which has oozed out cannot penetrate the coating film, the excessive amount of the bleeding lubricant can be reserved in the minute holes in the coating film. Thus, the bleeding lubricant is not prone to accumulate at the interface between the coating film and the rubber elastic body. Therefore, according to the anti-vibration rubber member of the present configuration, the coating film is not prone to separation from the rubber elastic body even at a high temperature. That is, the anti-vibration rubber member of the present configuration provides good durability.

(6) In the configuration of (5) above, the bleeding lubricant oozed out of the rubber elastic body is preferably reserved in at least some of the plurality of minute holes.

According to the present configuration, the bleeding lubricant oozed out of the rubber elastic body is reserved in the coating film. That is, the bleeding lubricant can remain in the coating film even if a large amount of the bleeding lubricant oozes out, and thus the bleeding lubricant is not prone to accumulate at the interface between the coating film and the rubber elastic body. Therefore, the coating film is not prone to separation from the rubber elastic body even at a high temperature. In addition, even in a portion of the sliding surface on which the lubricating film is insufficient and the coating film is exposed, the coating film reserving the bleeding lubricant is exposed and comes into sliding contact with the mating member. Thus, the anti-vibration rubber member has lower friction resistance to the mating member.

(7) In the configuration of any of (1) to (6) above, the rubber elastic body preferably has a holding hole in which the mating member is disposed, and the sliding inner surface is preferably an inner circumferential surface of the holding hole.

According to the present configuration, the friction resistance of the inner circumferential surface of the holding hole to an outer circumferential surface of the mating member can be reduced. Therefore, a torsional torque applied from the outer circumferential surface of the mating member to the inner circumferential surface of the holding hole can be reduced.

(8) A first production method of an anti-vibration rubber member according to the present invention is a production method of the anti-vibration rubber member of the configuration (1), which is characterized by including: creating a rubber elastic body that is made of a self-lubricating rubber containing an elastomer and a bleeding lubricant through a cross-linking reaction; degreasing a sliding inner surface that is a surface of the rubber elastic body disposed on an inner side of the sliding surface; coating the sliding inner surface after degreasing with a coating material that contains a thermosetting resin having at least one functional group selected from a mercapto group, a vinyl group, an epoxy group, a methacryloxy group, and an amino group, and a solid lubricant containing polytetrafluoroethylene particles and ultrahigh molecular weight polyethylene particles; and baking the rubber elastic body coated with the coating material such that a coating film comprising the coating material is formed on the sliding inner surface, and the bleeding lubricant of the rubber elastic body penetrates the coating film and oozes onto a surface of the coating film to form a lubricating film including the bleeding lubricant on the surface of the coating film.

The first production method of an anti-vibration rubber member according to the present invention has a cross-linking process, a degreasing process, a coating process, and a baking process. In the cross-linking process, the rubber elastic body is created through a cross-linking reaction. In the degreasing process, the sliding inner surface is degreased in order to temporarily remove the bleeding lubricant oozing from the sliding inner surface. In the coating process, the coating material containing a given thermosetting resin and a solid lubricant is applied (that includes coating by brushing or the like and also application by spraying or the like) on the sliding inner surface from which the bleeding lubricant has been removed. In the baking process, the coating material is hardened by heat and forms the coating film on the sliding inner surface of the rubber elastic body. The coating film is strongly joined (chemically bonded) to the rubber elastic body through the use of at least one functional group selected from the mercapto group, the vinyl group, the epoxy group, the methacryloxy group, and the amino group of the thermosetting resin. In addition, the bleeding lubricant of the rubber elastic body penetrates the coating film and oozes onto the surface of the coating film. The lubricating film is formed on the surface of the coating film primarily by the bleeding lubricant.

According to the first production method of an anti-vibration rubber member of the present invention, an anti-vibration rubber member that has low friction resistance to a mating member and includes a coating film having high wear resistance, can be relatively simply produced.

(9) A second production method of an anti-vibration rubber member according to the present invention is a production method of the anti-vibration rubber member of the configuration of (5), which is characterized by including: creating a rubber elastic body that is made of a self-lubricating rubber containing an elastomer and a bleeding lubricant through a cross-linking reaction; degreasing a sliding inner surface that is a surface of the rubber elastic body disposed on an inner side of the sliding surface; coating the sliding inner surface after degreasing with a coating material that contains a thermosetting resin having at least one functional group selected from a mercapto group, a vinyl group, an epoxy group, a methacryloxy group, and an amino group, a solid lubricant containing polytetrafluoroethylene particles and ultrahigh molecular weight polyethylene particles, and a minute hole forming agent that is released when baked to form minute holes in a coating film; and baking the rubber elastic body coated with the coating material such that the coating film is formed on the sliding inner surface while the minute hole forming agent is released from the coating material, and the bleeding lubricant of the rubber elastic body penetrates the coating film and oozes onto a surface of the coating film to form a lubricating film including the bleeding lubricant on the surface of the coating film.

The second production method of an anti-vibration rubber member according to the present invention is different from the first production method (8) in that a minute hole forming agent is mixed in a coating material for forming a coating film. The minute hole forming agent is released from the coating material by heat during baking. In the baking process, the minute hole forming agent is released when the coating material is cured, whereby the plurality of minute holes are formed inside the coating film.

According to the second production method of an anti-vibration rubber member of the present invention, the coating film having the plurality of minute holes can be relatively easily formed by compounding the minute hole forming agent in the coating material. Although the minute hole forming agent is released from the coating material by heat during baking, the minute hole forming agent and decomposition products of the minute hole forming agent may remain in the coating film after the coating material is cured unless the performance of the coating film is affected. In addition, the minute holes can be reliably formed if the minute hole forming agent is released when baked faster than the bleeding lubricant oozes out. In this respect, the baking temperature and the like may be adjusted besides choosing the resin of the coating film, the minute hole forming agent, the elastomer of the rubber elastic body, and the bleeding lubricant.

The minute holes formed in the coating film can reserve the bleeding lubricant oozed out of the rubber elastic body. Thus, even if the bleeding lubricant in the self-lubricating rubber oozes out faster than the bleeding lubricant penetrates the coating film at a high temperature and all of the bleeding lubricant that has oozed out cannot penetrate the coating film, the excessive amount of the bleeding lubricant is reserved in the minute holes in the coating film. Consequently, the bleeding lubricant is not prone to accumulate at the interface between the coating film and the rubber elastic body. Therefore, separation of the coating film from the rubber elastic body can be suppressed even at a high temperature.

Thus, according to the second production method of an anti-vibration rubber member of the present invention, an anti-vibration rubber member of the present invention that has low friction resistance to a mating member and includes a coating film having high wear resistance, and in which the coating film is not prone to separation from a rubber elastic body even at a high temperature, can be relatively simply produced.

(10) In the configuration of (9) above, the minute hole forming agent is preferably formed from at least one selected from a bleeding lubricant and a foaming agent.

The bleeding lubricant in the coating material oozes onto the surface of the coating film that is being cured when baked. The bleeding lubricant then forms the lubricating film. Meanwhile, the foaming agent is gasified when baked, and released from the coating film that is being cured. In either case, the minute holes are formed after the agent or the bleeding lubricant is removed. Thus, according to the present configuration, the minute holes can be formed without hindering formation of the coating film or the lubricating film.

(11) In the configuration of (9) above, preferably, the minute hole forming agent is formed from a bleeding lubricant, and the lubricating film is formed from both the bleeding lubricant contained in the rubber elastic body and the minute hole forming agent.

The bleeding lubricant is also contained in the rubber elastic body. The bleeding lubricant forms the lubricating film. Hence, according to the present configuration, impurities are not prone to remain in the coating film or the lubricating film, and the performance of the coating film or the lubricating film is not prone to be affected. Note that the bleeding lubricant for use as the minute hole forming agent may be the same as or different from the bleeding lubricant in the rubber elastic body in terms of component.

(11-1) In the configuration of (11) above, the thermosetting resin is preferably a silicone resin.

In the case where the matrix of the coating film is a silicone resin, the bleeding lubricant of the minute hole forming agent is easily removed from the coating film. Hence, the minute hole forming agent can be easily released faster than the bleeding lubricant oozes out of the rubber elastic body. This makes it possible to reliably form the minute holes.

(11-2) In the configuration of (11-1) above, the silicone resin preferably has a less dense cross-linked structure than a straight silicone resin and a modified product thereof, and has rubber elasticity.

According to the present configuration, the cross-linked structure of the silicone resin is not dense, whereby the bleeding lubricant of the minute hole forming agent can be even more easily removed from the coating film. Thus, the minute hole forming agent can be released faster, and the minute holes can be even more reliably formed.

(12) In the configuration of (10) or (11) above, the minute hole forming agent preferably includes at least one type of the bleeding lubricant contained in the rubber elastic body.

According to the present configuration, the lubricating film that affects the rubber elastic body to a small degree and that is stable can be formed. Moreover, the performance of the coating film or the lubricating film is not prone to be affected. The components of the bleeding lubricant of the minute hole forming agent may be completely the same as the components of the bleeding lubricant contained in the rubber elastic body, or may only partially overlap such components. In the latter case, it is desirable that the components of the bleeding lubricant of the minute hole forming agent include a main component (a component with a large amount) of the bleeding lubricant contained in the rubber elastic body.

(13) In the configuration of any of (9) to (12) above, the amount of the minute hole forming agent is preferably 0.5% by mass to 20% by mass when the total solid content forming the coating film is defined as 100% by mass.

The amount of the minute hole forming agent may be determined in consideration of the formation of the minute holes and the performance of the coating film. That is, if the amount of the minute hole forming agent is too large, the proportion in volume of the minute holes in the coating film is large and the strength and the rigidity of the coating film itself is reduced. In contrast, if the amount of the minute hole forming agent is too small, the minute holes enough to reserve the bleeding lubricant cannot be formed. In this respect, according to the present configuration, the minute holes can be formed in a desired manner while the performance of the coating film is maintained.

Effects of the Invention

The present invention can provide an anti-vibration rubber member that has low friction resistance to a mating member and includes a coating film having high wear resistance. The present invention can also provide a relatively simple production method of the anti-vibration rubber member.

DESCRIPTION OF THE REFERENCE NUMERALS

1L: stabilizer bushing (anti-vibration rubber member), 1R: stabilizer bushing (anti-vibration rubber member), 2L: bracket, 2R: bracket, 3R: stopper (anti-vibration rubber member), 4R: lower arm bushing, 5R: bracket, 8: vehicle, 9: vehicle.

10L: rubber elastic body, 11L: coating film, 12L: lubricating film, 20L: bushing support portion, 21L: fixing portion, 30R: circular disc, 31R: rubber member body, 32R: rubber elastic body, 33R: coating film, 34R: lubricating film, 35R: coating material, 40R: inner tube fitting, 41R: outer tube fitting, 42R: rubber member, 50R: front wall, 51R: rear wall, 80: suspension, 81: hub unit, 83: drive shaft, 84R: lower suspension arm, 90: suspension, 91: hub unit, 92: steering gear, 93: drive shaft, 95: body.

100L: holding hole, 101L: cut portion, 102L: blend rubber (elastomer), 103L: bleeding lubricant, 104L: flange portion, 110L: silicone resin, 112L: minute hole, 113L: minute hole forming agent, 115L: PTFE particles (solid lubricant), 116L: UHPE particles (solid lubricant), 200L: flange portion, 210L: bolt insertion hole, 211L: bolt, 300R: bolt insertion hole, 320R: rib, 321R: blend rubber (elastomer), 322R: bleeding lubricant, 330R: silicone resin, 332R: minute hole, 333R: base material, 334R: minute hole forming agent, 335R: PTFE particles (solid lubricant), 336R: UHPE particles (solid lubricant), 500R: bolt insertion hole, 510R: bolt insertion hole, 800R: spring, 801R: shock absorber, 840R: bushing accommodation tube portion (mating member), 841R: bolt, 842R: nut, 900L: spring, 900R: spring, 901L: shock absorber, 901R: shock absorber, 902L: lower suspension arm, 902R: lower suspension arm, 903: stabilizer bar (mating member), 950L: recess portion, 951L: bolt securing hole.

C: clearance, S: fastening amount.

MODES FOR CARRYING OUT THE INVENTION

Hereinafter, embodiments of an anti-vibration rubber member and a production method thereof according to the present invention will be described.

First Embodiment

The present embodiment practices the anti-vibration rubber member of the present invention as a stopper.

[Stopper Layout]

Figure 1:
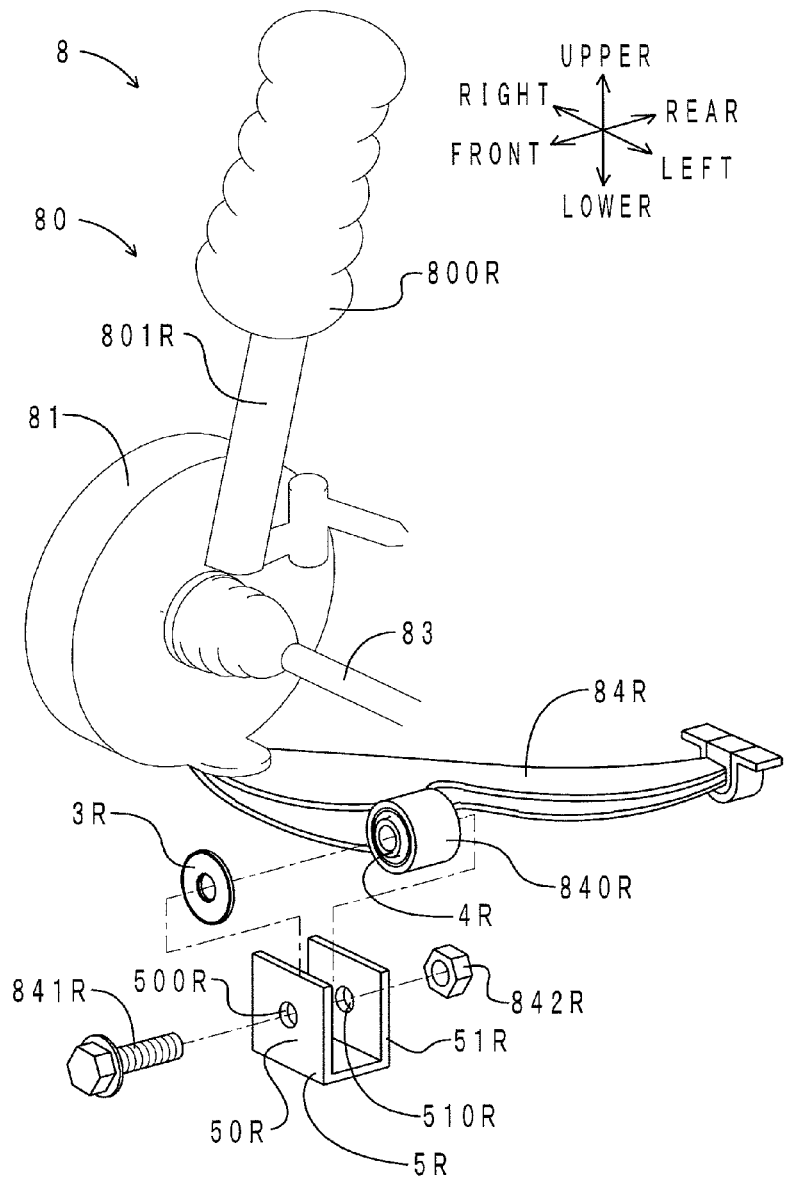
FIG. 1 is a layout drawing of a stopper according to a first embodiment.

First, the layout of the stopper according to the present embodiment will be described. FIG. 1 shows a layout drawing of the stopper according to the present embodiment. As shown in FIG. 1, members including a suspension 80, a hub unit 81, and a drive shaft 83 are arranged in the vicinity of a front wheel of a vehicle 8. The suspension 80 includes a spring 800R, a shock absorber 801R, and a lower suspension arm 84R. The lower suspension arm 84R is made of steel and has a generally flat V-shaped configuration. A front end (an end of the V shape) of the lower suspension arm 84R is formed with a bushing accommodation tube portion 840R. A lower arm bushing 4R is press-fit to an inner portion of the bushing accommodation tube portion 840R. A stopper 3R is disposed in front of the lower arm bushing 4R. A bracket 5R is made of steel and has a C-shaped configuration that opens upward. The bracket 5R is fixed to a body (not shown) of the vehicle 8. The stopper 3R and the bushing accommodation tube portion 840R (lower arm bushing 4R) are accommodated in an inner portion of the C-shaped opening of the bracket 5R. The stopper 3R and the lower arm bushing 4R are oscillatably attached to the bracket 5R by a bolt 841R and a nut 842R. The stopper 3R suppresses the bushing accommodation tube portion 840R from coming into direct sliding contact with the bracket 5R. The bushing accommodation tube portion 840R is included in a mating member of the present invention.

[Stopper Structure]

Figure 2:
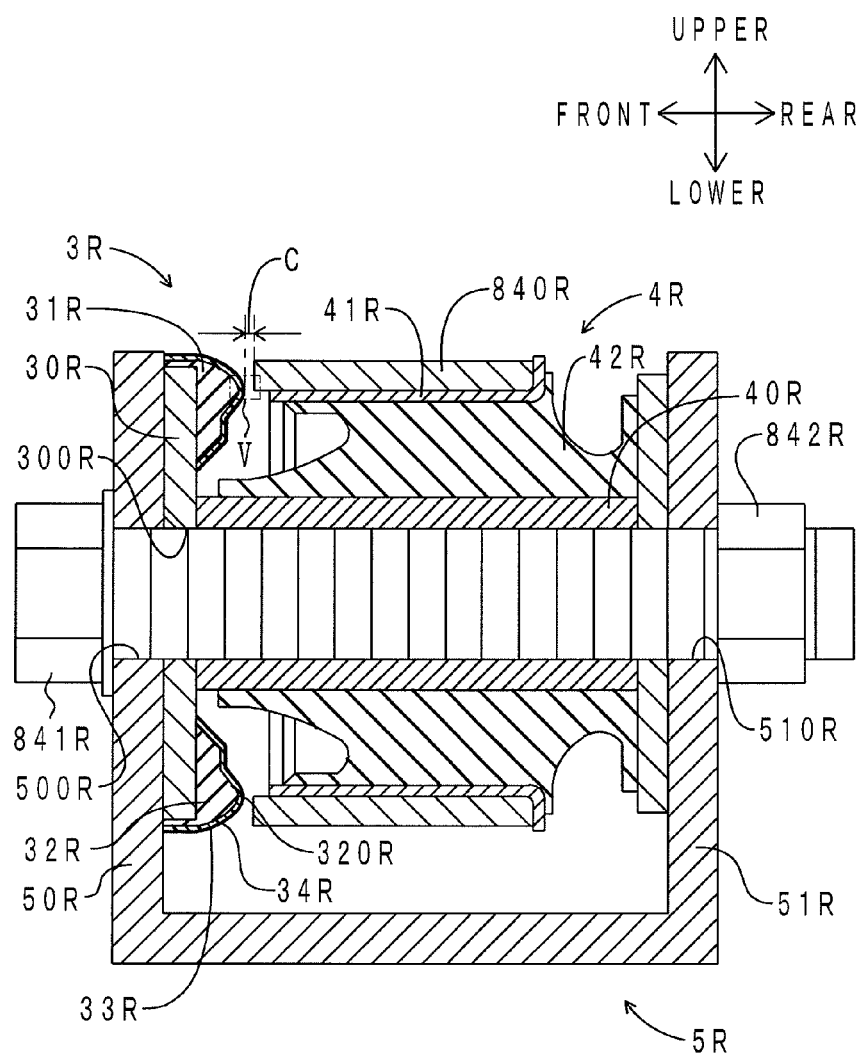
FIG. 2 is an axial cross-sectional view of the stopper and a lower arm bushing mounted to a bracket.
Figure 3:
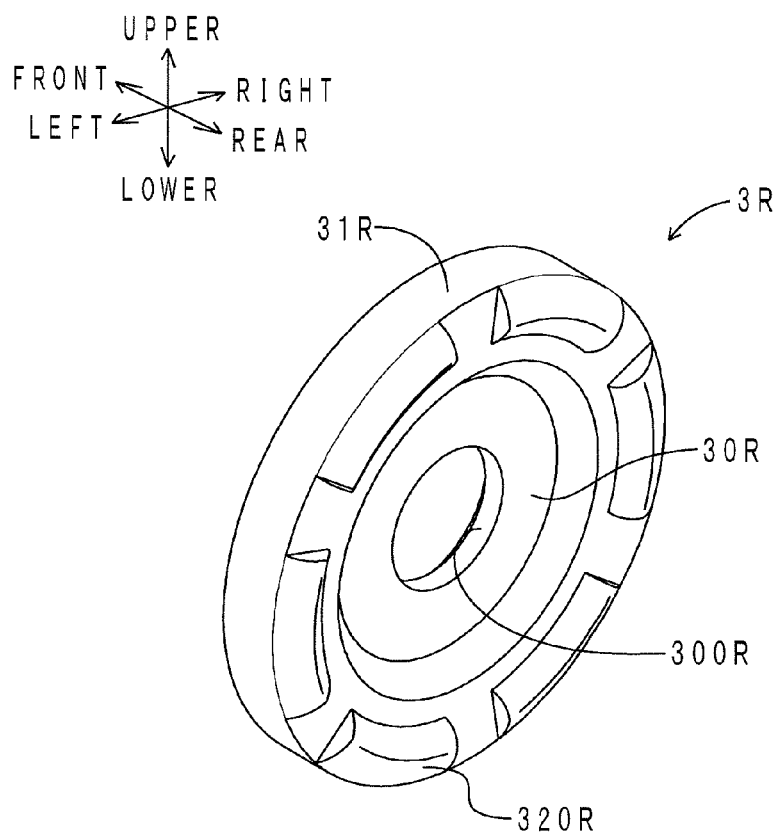
FIG. 3 is a perspective view of the stopper.
Figure 4:
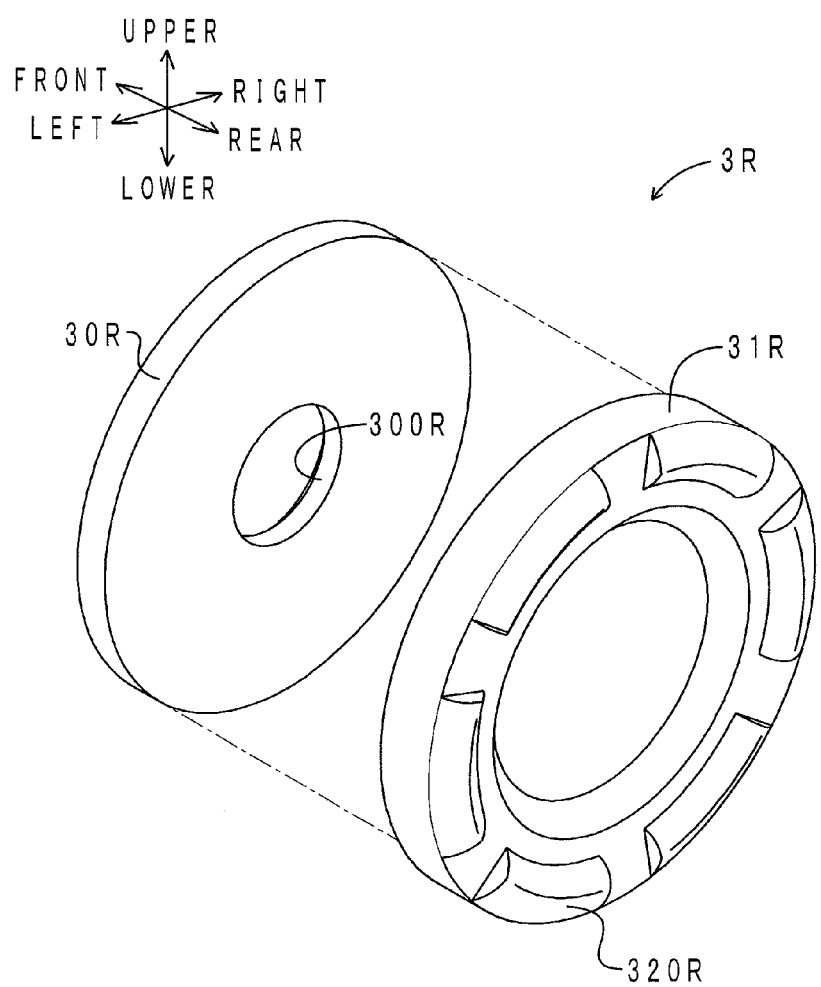
FIG. 4 is an exploded perspective view of the stopper.
Figure 5:
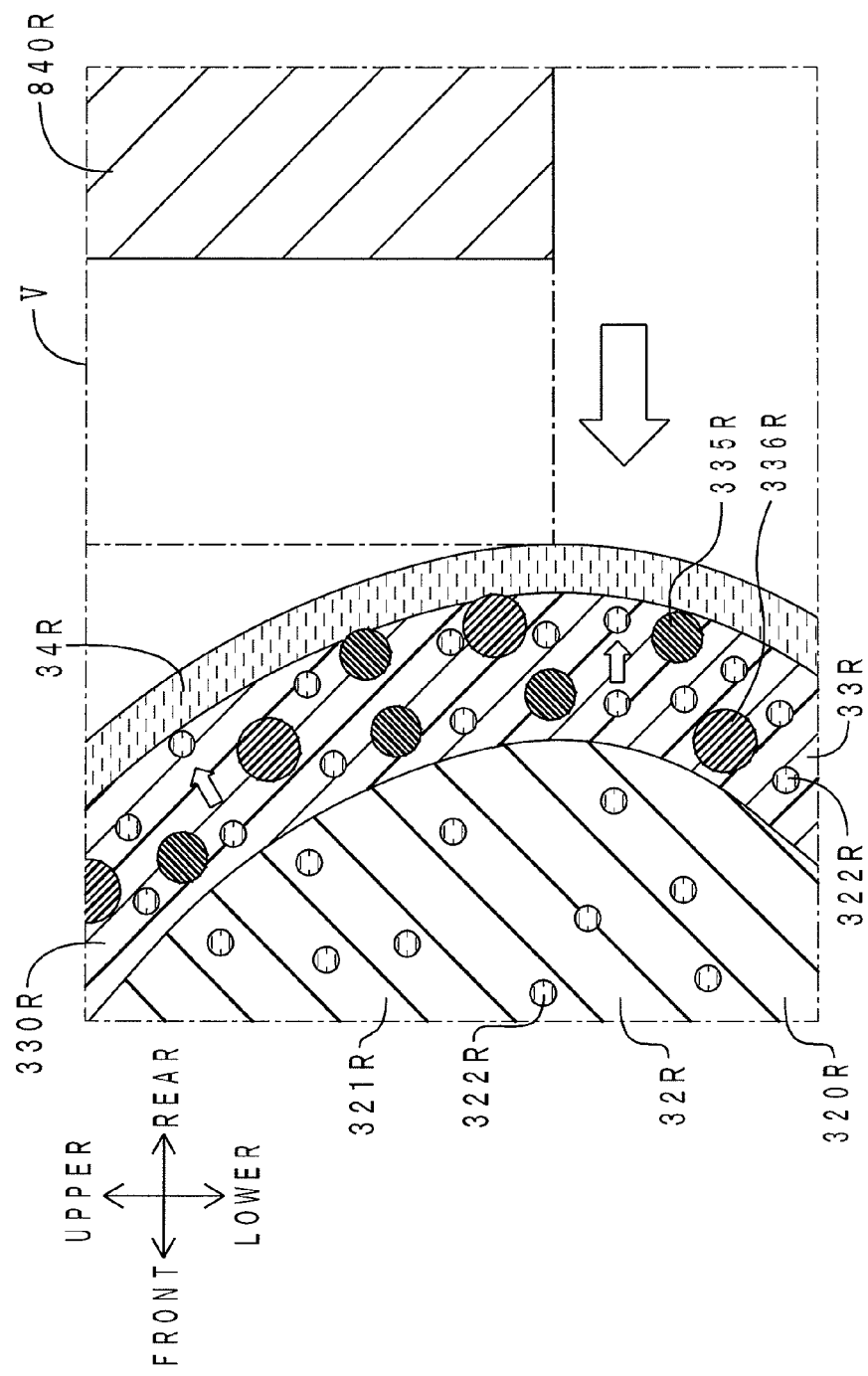
FIG. 5 is an enlarged view of the inside of a frame V in FIG. 2.

Next, the structure of the stopper 3R according to the present embodiment will be described. FIG. 2 shows an axial (longitudinal) cross-sectional view of the stopper and the lower arm bushing mounted to the bracket according to the present embodiment. FIG. 3 shows a perspective view of the stopper according to the present embodiment. FIG. 4 shows an exploded perspective view of the stopper according to the present embodiment. FIG. 5 shows an enlarged view of the inside of a frame V in FIG. 2. Note that FIG. 5 is a schematic diagram for explaining the function of the stopper 3R of the present embodiment. As shown in FIGS. 2 to 5, the stopper 3R of the present embodiment includes a circular disc 30R and a rubber member body 31R.

The circular disc 30R is made of steel and has a ring shape. A bolt insertion hole 300R is formed at the center of the circular disc 30R. The bolt 841R is inserted into the bolt insertion hole 300R.

The rubber member body 31R includes a rubber elastic body 32R, a coating film 33R, and a lubricating film 34R. The rubber elastic body 32R has a ring shape. The rubber elastic body 32R is disposed so as to cover the rear surface and the outer circumferential surface of the circular disc 30R. The rubber elastic body 32R and the circular disc 30R are bonded together by cross-linking. The rear surface of the rubber elastic body 32R is formed with a plurality of ribs 320R. The ribs 320R are arranged in a circular configuration. The ribs 320R are also arranged in series to form a dashed line. The surface of the rib 320R is included in a sliding inner surface of the present invention. The surface of the rib 320R has a predetermined curvature and is shaped as a generally smooth surface. The coating film 33R covers the surface of the rubber elastic body 32R. The coating film 33R has a thickness of approximately 20 μm. The lubricating film 34R is in liquid form and covers the surface of the coating film 33R.

[Stopper Material]

Next, the material of the stopper 3R according to the present embodiment will be described with reference to FIG. 5. The rubber elastic body 32R is made of a self-lubricating rubber. The rubber elastic body 32R includes a blended rubber (referred to simply as a "blend rubber" below) 321R of a natural rubber (NR) and a butadiene rubber (BR), and a bleeding lubricant 322R. Two types of oleic acid amides with different melting points are used as the bleeding lubricant 322R. The blend rubber 321R is included in an elastomer of the present invention.

The coating film 33R includes a silicone resin 330R having a mercapto group, a polytetrafluoroethylene (PTFE) particles 335R, and an ultrahigh molecular weight polyethylene (UHPE) particles 336R. The PTFE particle 335R has a generally spherical shape with an average particle diameter of approximately 0.5 μm. The UHPE particle 336R has a generally spherical shape with an average particle diameter of approximately 1 μm. The mass-average molecular weight of UHPE is 2 million. A total amount of the PTFE particles 335R and the UHPE particles 336R (solid lubricant) to be contained is 30 parts by mass per 100 parts by mass of the silicone resin 330R. A percentage of the UHPE particles 336R constituting the solid lubricant is 70% by mass if the total mass of the PTFE particles 335R and the UHPE particles 336R is defined as 100% by mass.

The lubricating film 34R is formed of the bleeding lubricant (oleic acid amide) 322R of the rubber elastic body 32R. That is, as a white arrow in FIG. 5 shows, the bleeding lubricant 322R of the rubber elastic body 32R penetrates the coating film 33R. The bleeding lubricant 322R then oozes onto the surface of the coating film 33R. The lubricating film 34R is thus formed of the oozed bleeding lubricant 322R.

[Lower Arm Bushing and Bracket Structure]

Next, the structure of the lower arm bushing 4R and the bracket 5R according to the present embodiment will be briefly described with reference to FIG. 2. The lower arm bushing 4R includes an inner tube fitting 40R, an outer tube fitting 41R, and a rubber member 42R. The inner tube fitting 40R is made of steel and has a cylindrical shape. The bolt 841R is inserted into the inner tube fitting 40R. The outer tube fitting 41R is made of steel and has a cylindrical shape. The outer tube fitting 41R is disposed on a radially outer side of the inner tube fitting 40R. The outer tube fitting 41R is also press-fit to the bushing accommodation tube portion 840R. The rubber member 42R is made of rubber and interposed between the inner tube fitting 40R and the outer tube fitting 41R. The rubber member 42R, the inner tube fitting 40R, and the outer tube fitting 41R are bonded together by cross-linking.

The bracket 5R includes a front wall 50R and a rear wall 51R. A bolt insertion hole 500R is provided in the front wall 50R. A bolt insertion hole 51R is provided in the rear wall 51R. The bolt 841R passes through the bolt insertion hole 500R, the bolt insertion hole 300R, an inner portion of the inner tube fitting 40R, and the bolt insertion hole 510R. The nut 842R is threadedly fastened to a penetrating end (rear end) of the bolt 841R.

As shown in FIG. 2, a predetermined clearance C is secured between the stopper 3R and the bushing accommodation tube portion 840R. However, as a white arrow in FIG. 5 shows, the bushing accommodation tube portion 840R may slide forward with respect to the outer circumferential surface of the outer tube fitting 41R. In such cases, the rear surface of the stopper 3R (specifically, the surface of the lubricating film 34R covering the vicinity of a top portion of the rib 320R (and the surface of the coating film 33R at portions insufficiently covered by the lubricating film 34R)) is relatively in sliding contact with the front end surface of the bushing accommodation tube portion 840R.

[Stopper Production Method]

Figure 6:
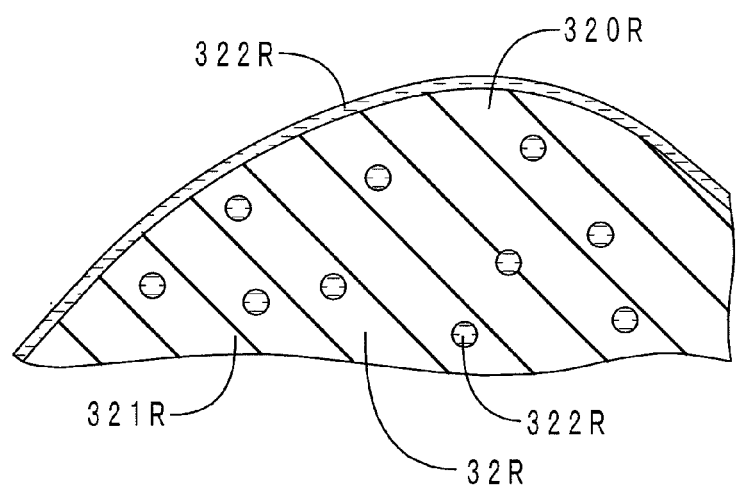
FIG. 6 is an enlarged cross-sectional view of a rubber elastic body after a cross-linking process, but before a degreasing process.
Figure 7:
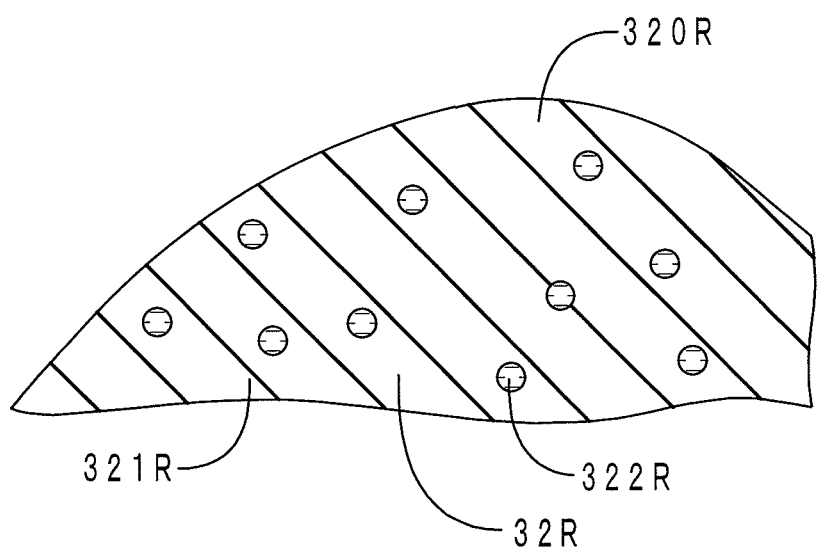
FIG. 7 is an enlarged cross-sectional view of the rubber elastic body after the degreasing process, but before a coating process.
Figure 8:
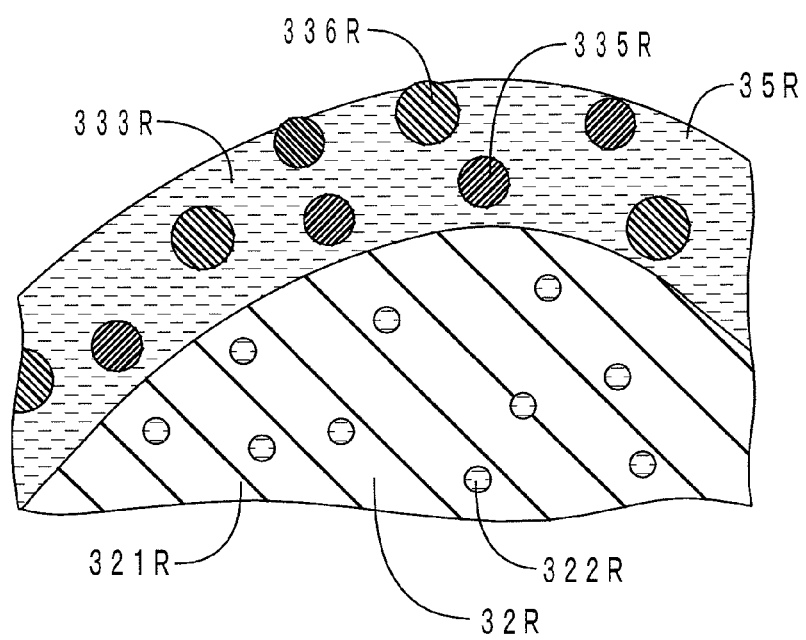
FIG. 8 is an enlarged cross-sectional view of the rubber elastic body after the coating process, but before a baking process.
Figure 9:
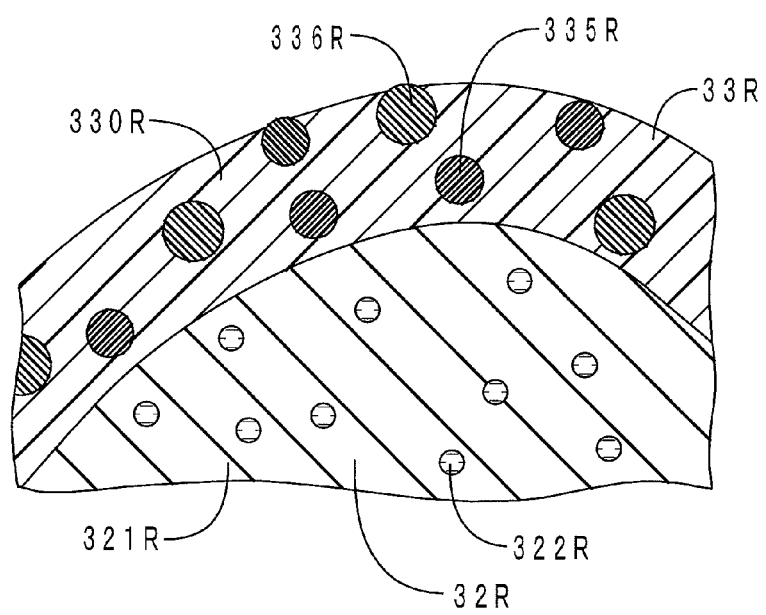
FIG. 9 is an enlarged cross-sectional view of the rubber elastic body during the baking process.
Figure 10:
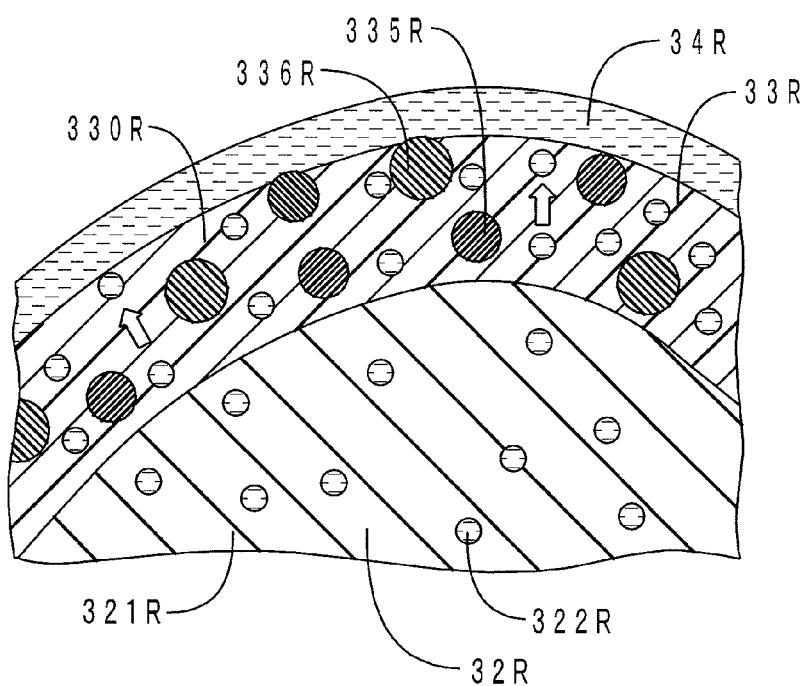
FIG. 10 is an enlarged cross-sectional view of the stopper after the baking process.

Next, a production method of the stopper 3R according to the present embodiment will be described. The production method of the stopper 3R according to the present embodiment includes a composition preparation process, a cross-linking process, a degreasing process, a coating process, and a baking process. FIG. 6 shows an enlarged cross-sectional view of the rubber elastic body after the cross-linking process, but before the degreasing process. FIG. 7 shows an enlarged cross-sectional view of the rubber elastic body after the degreasing process, but before the coating process. FIG. 8 shows an enlarged cross-sectional view of the rubber elastic body after the coating process, but before the baking process. FIG. 9 shows an enlarged cross-sectional view of the rubber elastic body during the baking process. FIG. 10 shows an enlarged cross-sectional view of the stopper according to the present embodiment after the baking process. Note that FIGS. 6 to 10 all show a region that corresponds to FIG. 5 (the region in FIG. 5 is rotated 90 degrees in FIGS. 6 to 10).

In the composition preparation process, a composition is prepared by mixing together a base material of the blend rubber 321R, the bleeding lubricant 322R, a cross-linking agent, and the like.

In the cross-linking process, first, the circular disc 30R (see FIG. 2) is disposed in a cavity. The composition is then injected into the mold cavity. Subsequently, the base material of the blend rubber 321R inside the cavity undergoes a cross-linking reaction by maintaining the mold at 160° C. for 8 minutes. Thereafter, the mold is opened and an intermediate, in which the rubber elastic body 32R and the circular disc 30R are bonded by cross-linking, is retrieved from the cavity. As shown in FIG. 6, the bleeding lubricant 322R oozes onto the surface of the rubber elastic body 32R.

In the degreasing process, the surface of the rubber elastic body 32R is degreased using isopropyl alcohol (IPA). As shown in FIG. 7, the bleeding lubricant 322R is thus removed from the surface of the rubber elastic body 32R.

In the coating process, as shown in FIG. 8, the surface of the cleaned rubber elastic body 32R is coated with a coating material 35R. The coating material 35R contains a base material 333R of the silicone resin 330R having a mercapto group, the PTFE particles 335R, and the UHPE particles 336R.

In the baking process, the rubber elastic body 32R coated with the coating material 35R is baked at 100° C. for 30 minutes. Baking thermally hardens the base material 333R shown in FIG. 8. As shown in FIG. 9, the coating film 33R forms on the surface of the rubber elastic body 32R. Meanwhile, as a white arrow in FIG. 10 shows, the bleeding lubricant 322R of the rubber elastic body 32R penetrates the coating film 33R. The lubricating film 34R is thus formed on the surface of the coating film 33R by the bleeding lubricant 322R that has penetrated the coating film 33R. Thus, the stopper 3R according to the present embodiment is produced.

[Operation and Effects]

Next, the operation and effects of the stopper 3R and the production method thereof according to the present embodiment will be described. The lubricating film 34R of the stopper 3R according to the present embodiment is in sliding contact with the bushing accommodation tube portion 840R. In addition, for example, if the sliding surface has a portion without a sufficient lubricating film 34R due to a temporary lack of the lubricating film 34R or the like, the coating film 33R is exposed from the portion and in sliding contact with the bushing accommodation tube portion 840R. In other words, even if the lubricating film 34R is insufficient, the coating film 33R is in sliding contact with the bushing accommodation tube portion 840R. The coating film 33R contains the bleeding lubricant 322R oozed out of the rubber elastic body 32R, the PTFE particles 335R, and the UHPE particles 336R. Thus, the friction resistance between the coating film 33R and the bushing accommodation tube portion 840R is low. In addition, the wear resistance of the coating film 33R is high. A percentage of the UHPE particles 336R constituting the solid lubricant is 70% by mass. Accordingly, the coating film 33R having desired friction resistance and wear resistance can be obtained.

A thickness of the coating film 33R is approximately 20 μm. An average particle diameter of the PTFE particles 335R is approximately 0.5 μm, and an average particle diameter of the UHPE particles 336R is approximately 1 μm. Thus, the surface of the coating film 33R is smooth, so that the PTFE particles 335R and the UHPE particles 336R do not tend to be fallen out. For the small average particle diameters, the PTFE particles 335R and the UHPE particles 336R are easily dispersed in the base material 333R. Thus, the coating material 35R can easily be prepared. In addition, a total amount of the PTFE particles 335R and the UHPE particles 336R to be contained is 30 parts by mass per 100 parts by mass of the silicone resin 330R. Thus, the rubber elastic body 32R and the coating film 33R are strongly joined with the silicone resin 330R. Accordingly, the coating film 33R is not prone to separation from the rubber elastic body 32R. As explained, the stopper 3R according to the present embodiment provides good durability because of the low friction resistance between the stopper 3R and the bushing accommodation tube portion 840R.

The silicone resin 330R for forming the coating film 33R has a less dense cross-linked structure than a straight silicone resin and a modified product thereof, and the silicone resin 330R has rubber elasticity. This facilitates penetration of the bleeding lubricant 322R of the rubber elastic body 32R through the coating film 33R. Therefore, the lubricating film 34R can be reliably formed on the surface of the coating film 33R. In addition, the coating film 33R is relatively flexible because the coating film 33R is formed with the silicone resin 330R included. Therefore, the coating film 33R easily deforms to follow up deformation of the rubber elastic body 32R.

Second Embodiment

A stopper of the present embodiment is different from a stopper of the first embodiment in that a coating film has minute holes. The production method of a stopper of the present embodiment is also different from the production method of a stopper of the first embodiment in that a minute hole forming agent is mixed in a coating material for forming a coating film. Thus, only the differences will be explained below.

[Stopper Material]

Figure 11:
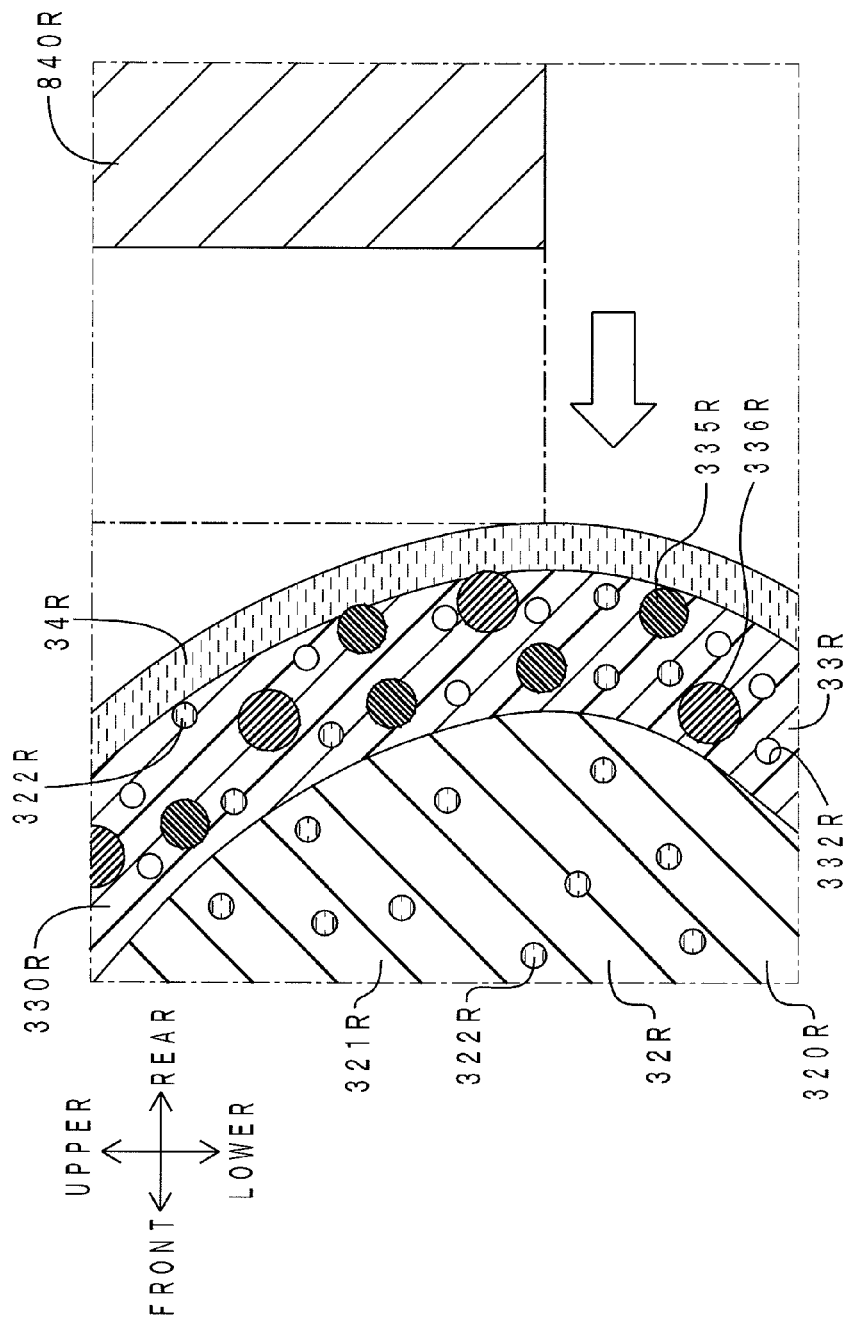
FIG. 11 is an enlarged view of the area in a stopper according to a second embodiment, in which the area corresponds to the inside of the frame V in FIG. 2

FIG. 11 is an enlarged view of the area in the stopper according to the present embodiment, in which the area corresponds to the inside of the frame V in FIG. 2 above. Similarly to FIG. 5, FIG. 11 is a schematic diagram for explaining the function of the stopper of the present embodiment. In FIG. 11, the region that corresponds to FIG. 5 is indicated by the same reference numeral as in FIG. 5.

The coating film 33R includes the silicone resin 330R having a mercapto group, the PTFE particles 335R, the UHPE particles 336R, and the plurality of minute holes 332R. The plurality of minute holes 332R are dispersed inside the coating film 33R. The size of the minute holes 332R is estimated to be at the level of molecules of a minute hole forming agent 334R used to form the minute holes 332R. Some of the minute holes 332R are filled with the bleeding lubricant 322R oozed out of the rubber elastic body 32R.

The lubricating film 34R is formed of the bleeding lubricant 322R of the rubber elastic body 32R and the minute hole forming agent 334R used to form the minute holes 332R of the coating film 33R. The method of forming the lubricating film 34R will be discussed in the following "Stopper Production Method."

[Stopper Production Method]

The production method of the stopper according to the present embodiment includes a composition preparation process, a cross-linking process, a degreasing process, a coating process, and a baking process. The composition preparation process, the cross-linking process, and the degreasing process of the production method of the stopper according to the present embodiment are the same as the production method of the stopper according to the first embodiment, and thus descriptions of these processes will not be included here.

Figure 12:
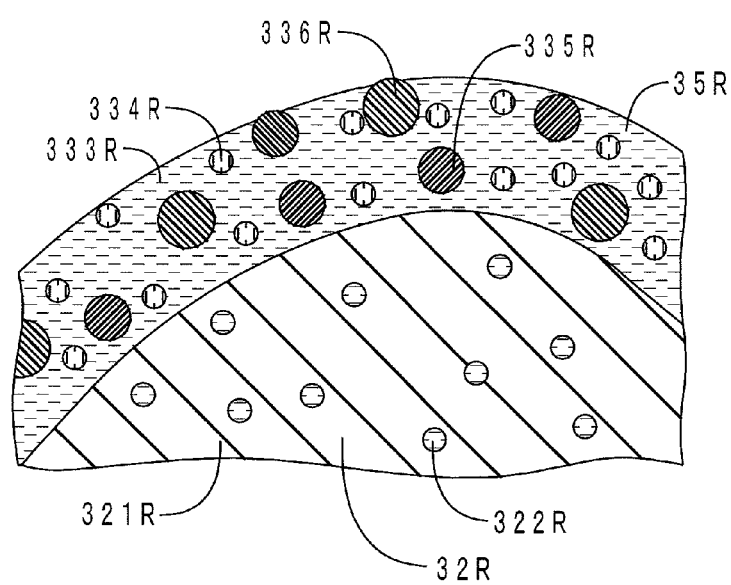
FIG. 12 is an enlarged cross-sectional view of the rubber elastic body after the coating process, but before a baking process.
Figure 13:
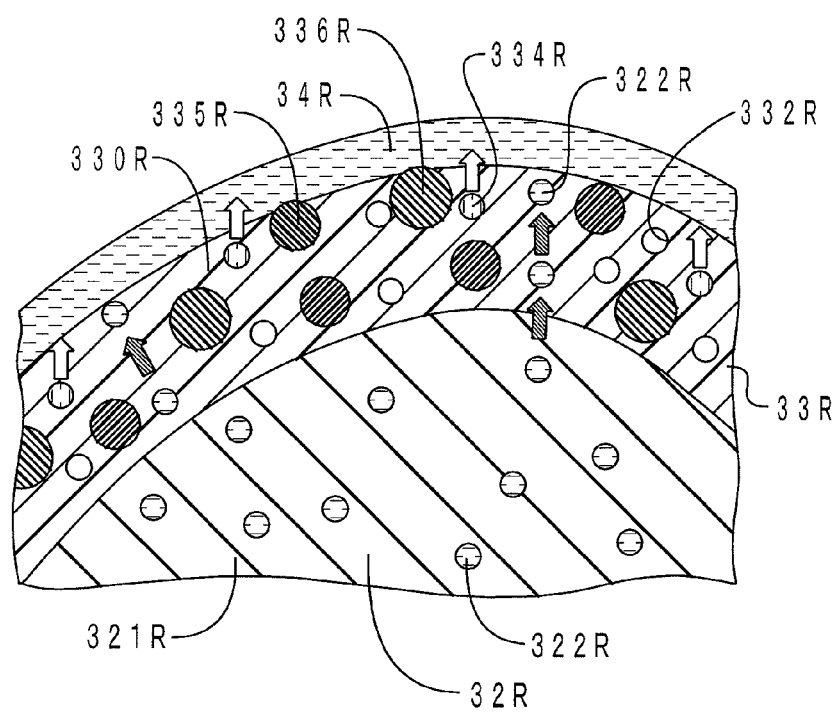
FIG. 13 is an enlarged cross-sectional view of the rubber elastic body during the baking process.

FIG. 12 shows an enlarged cross-sectional view of the rubber elastic body after the coating process, but before the baking process. Note that each of FIGS. 12 and 13 shows a region that corresponds to FIG. 11 (the region in FIG. 11 is rotated 90 degrees in each of FIGS. 12 and 13).

In the coating process, as shown in FIG. 12, the surface of the cleaned rubber elastic body 32R is coated with a coating material 35R. The coating material 35R contains a base material 333R of the silicone resin 330R having a mercapto group, the PTFE particles 335R, the UHPE particles 336R, and the minute hole forming agent 334R. The minute hole forming agent 334R is one (main component with a lower melting point) of the two types of oleic acid amides used as the bleeding lubricant 322R. The amount of the minute hole forming agent 334R is 10% by mass if the solid content of the coating material 35R is defined as 100% by mass.

In the baking process, the rubber elastic body 32R coated with the coating material 35R is baked at 100° C. for 30 minutes. Baking thermally hardens the base material 333R shown in FIG. 12. As shown in FIG. 13, the coating film 33R forms on the surface of the rubber elastic body 32R. In this event, as white arrows in FIG. 13 show, the minute hole forming agent 334R in the coating material 35R is released to ooze onto the surface of the coating film 33R. In addition, as hatched arrows in FIG. 13 show, the bleeding lubricant 322R of the rubber elastic body 32R also penetrates the coating film 33R to ooze onto the surface of the coating film 33R. The lubricating film 34R is thus formed of the minute hole forming agent 334R (oleic acid amide) and the bleeding lubricant 322R (oleic acid amide) that have oozed onto the surface of the coating film 33R. In addition, the minute holes 332R are formed in the coating film 33R after the minute hole forming agent 334R is released. Thus, the stopper 3R according to the present embodiment is produced.

With respect to portions with common structures, the stopper and the production method thereof according to the present embodiment have the same operation and effects as the stopper and the production method thereof according to the first embodiment. In the stopper according to the present embodiment, the coating film 33R has the plurality of minute holes 332R. The minute holes 332R can reserve the bleeding lubricant 322R oozed out of the rubber elastic body 32R. Thus, even if the bleeding lubricant 322R in the rubber elastic body 32R oozes out faster than the bleeding lubricant 322R penetrates the coating film 33R at a high temperature, the excessive amount of the bleeding lubricant 322R is reserved in the minute holes 332R in the coating film 33R. Consequently, the bleeding lubricant 322R is not prone to accumulate at the interface between the coating film 33R and the rubber elastic body 32R. Therefore, in the stopper according to the present embodiment, the coating film 33R is not prone to separation from the rubber elastic body 32R even at a high temperature. Thus, the stopper according to the present embodiment provides good durability.

In the production method of a stopper of the present embodiment, the minute hole forming agent 334R is mixed in the coating material 35R. In the baking process, as shown in FIG. 13, the minute hole forming agent 334R is released when the coating material 35R is cured, whereby the plurality of minute holes 332R can be formed inside the coating film 33R. Thus, according to the production method of the stopper according to the present embodiment, the coating film 33R having the plurality of minute holes 332R can be relatively easily formed.

The minute hole forming agent 334R is one of the two types of oleic acid amides used as the bleeding lubricant 322R. That is, the minute hole forming agent 334R is the same as one of the components of the bleeding lubricant 322R in the rubber elastic body 32R. Therefore, the lubricating film 34R that affects the rubber elastic body 32R to a small degree and that is stable can be formed. Moreover, impurities are not prone to remain in the coating film 33R or the lubricating film 34R, and the performance of the coating film 33R or the lubricating film 34R is not prone to be affected. Furthermore, the amount of the minute hole forming agent 334R is 10% by mass if the solid content of the coating material 35R is defined as 100% by mass. This makes it possible to form the minute holes 332R necessary to reserve the bleeding lubricant 322R and maintain the performance of the coating film 33R.

Third Embodiment

Figure 14:
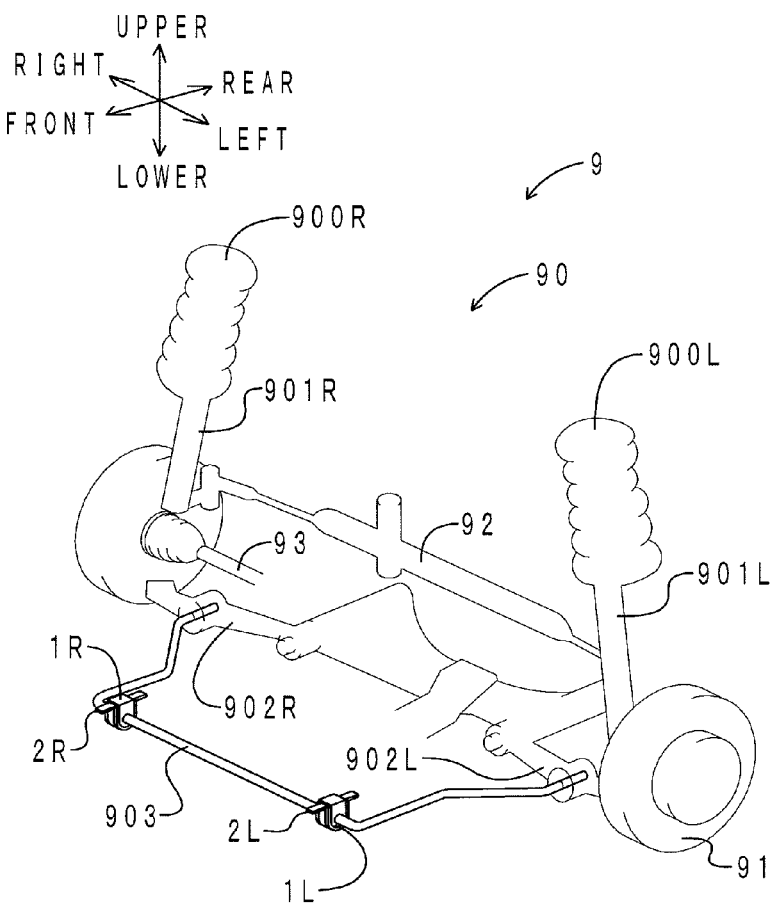
FIG. 14 is a layout drawing of a stabilizer bushing according to a third embodiment.

The present embodiment practices the anti-vibration rubber member of the present invention as a stabilizer bushing.
[Stabilizer Bushing Layout]
First, the layout of the stabilizer bushing according to the present embodiment will be described. FIG. 14 shows a layout drawing of the stabilizer bushing according to the present embodiment. As shown in FIG. 14, members including a suspension 90, a hub unit 91, a steering gear 92, and a drive shaft 93 are arranged in the vicinity of front wheels of a vehicle 9. The suspension 90 includes springs 900L, 900R, shock absorbers 901L, 901R, lower suspension arms 902L, 902R, and a stabilizer bar 903. The stabilizer bar 903 is made of steel and has a long-axis pipe configuration that expands forward in a C shape. Both ends of the stabilizer bar 903 in the left-right direction are connected to the lower suspension arms 902L, 902R. Two left and right locations in a center portion of the stabilizer bar 903 are connected to a body (not shown) of the vehicle 9 through stabilizer bushings 1L, 1R and brackets 2L, 2R. Thus, the stabilizer bushings 1L, 1R are interposed between the stabilizer bar 903 and the body of the vehicle 9. The stabilizer bushings 1L, 1R suppress the transmission of vibration input from the front wheels to the body of the vehicle 9 through the stabilizer bar 903. The stabilizer bar 903 is included in the mating member of the present invention.

[Stabilizer Bushing Structure]
Next, the structure of the stabilizer bushings 1L, 1R according to the present embodiment will be described. The two left and right stabilizer bushings 1L, 1R have identical structures. The structure of the left stabilizer bushing 1L will be explained below, and this description also serves to explain the structure of the right stabilizer bushing 1R.

Figure 15:
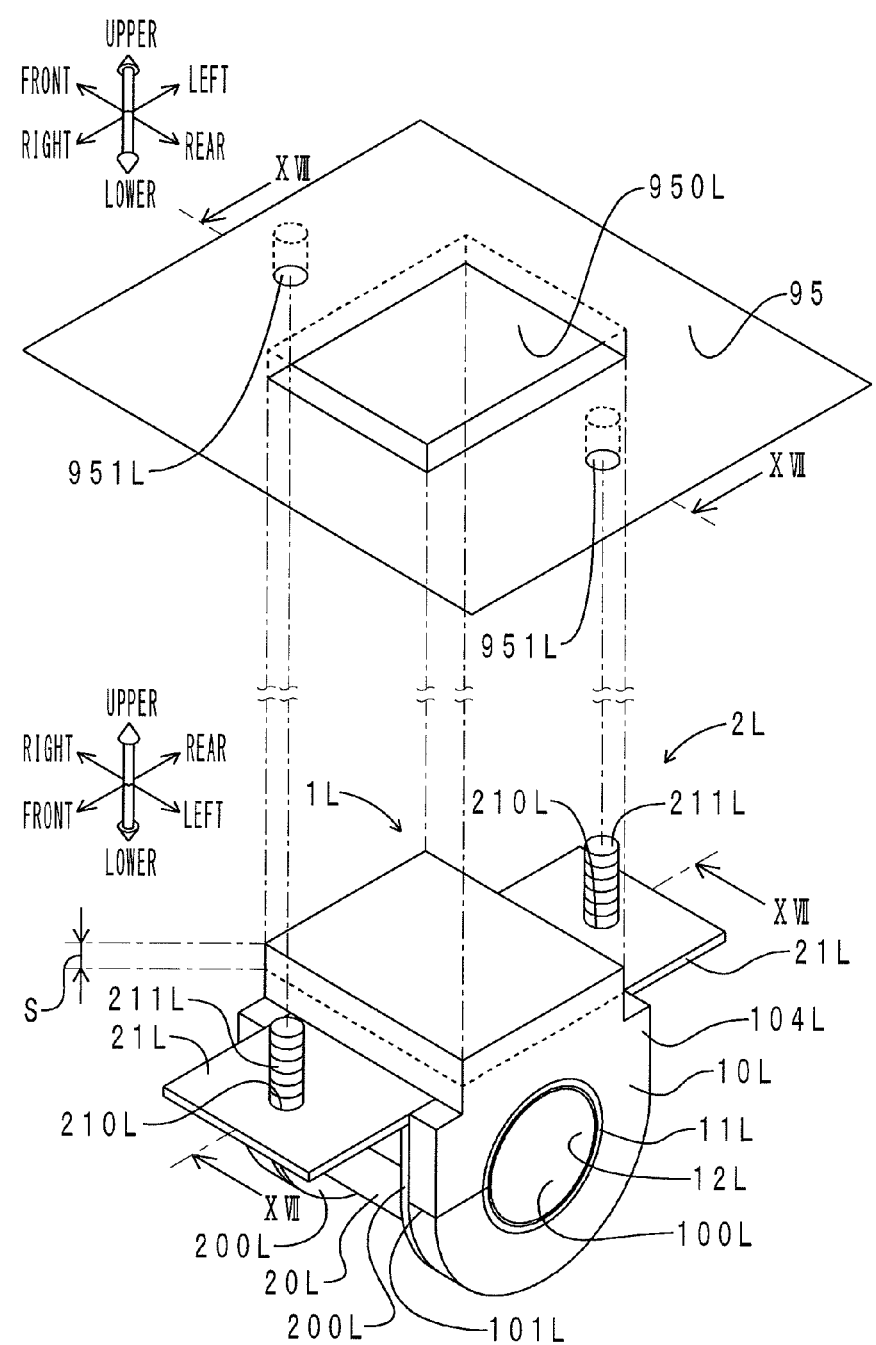
FIG. 15 is a composite perspective view of the stabilizer bushing and a bracket.
Figure 16:
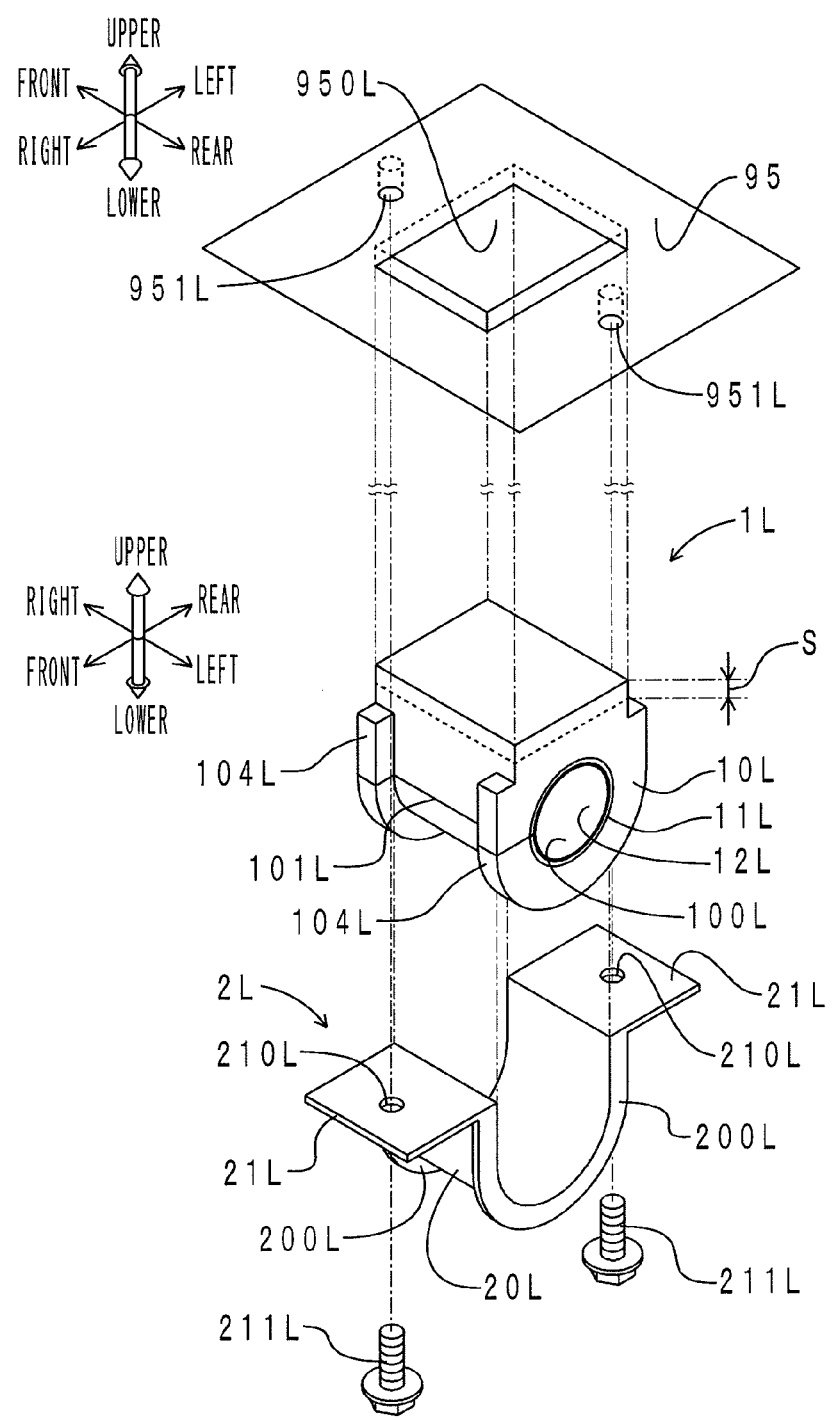
FIG. 16 is an exploded perspective view of the stabilizer bushing and the bracket.
Figure 17:
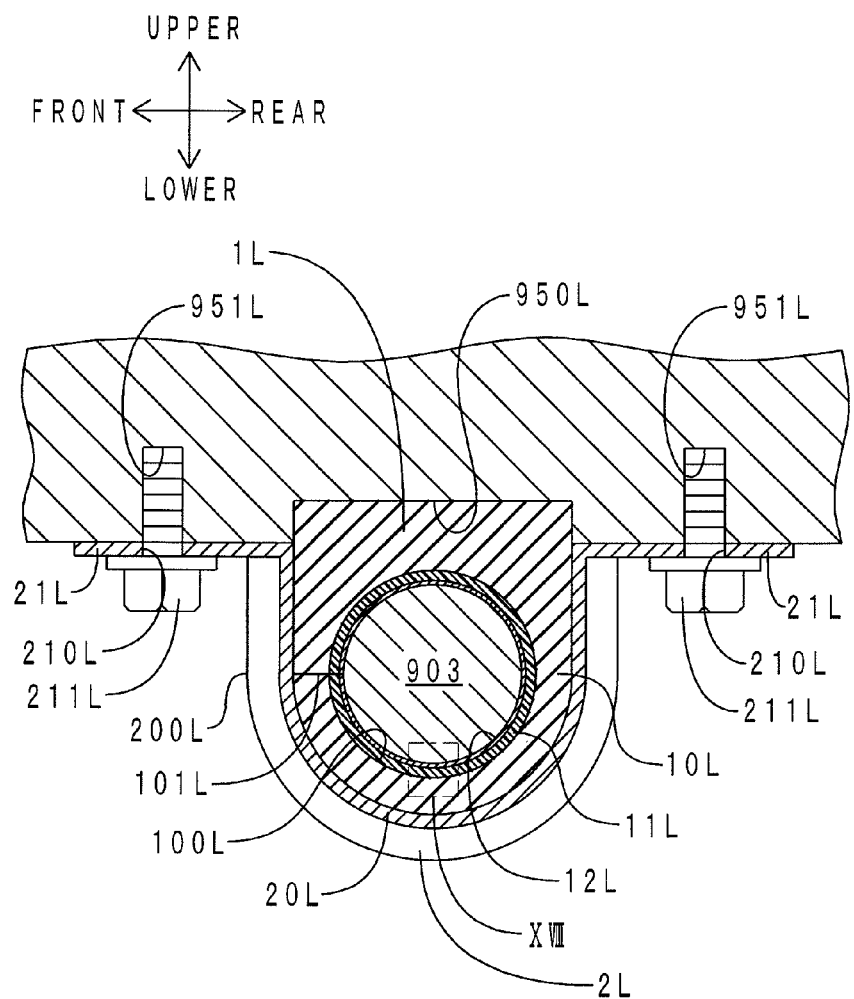
FIG. 17 is a cross-sectional view taken along a line XVII-XVII in FIG. 15.

FIG. 15 shows a composite perspective view of the stabilizer bushing and the bracket according to the present embodiment. FIG. 16 shows an exploded perspective view of the stabilizer bushing and the bracket according to the present embodiment. FIG. 17 shows a cross-sectional view taken along a line XVII-XVII in FIG. 15. As shown in FIGS. 15 to 17, the stabilizer bushing 1L of the present embodiment includes a rubber elastic body 10L, a coating film 11L, and a lubricating film 12L.

The rubber elastic body 10L has a solid U-shaped configuration when viewed from the left or right direction. In other words, an upper portion of the rubber elastic body 10L has a rectangular shape. A lower portion of the rubber elastic body 10L has a semicircular shape. The rubber elastic body 10L has a holding hole 100L that passes through the rubber elastic body 10L in the left-right direction. The inner circumferential surface of the holding hole 100L is included in the sliding inner surface of the present invention. The inner circumferential surface of the holding hole 100L has a predetermined curvature and is shaped as a generally smooth surface. In other words, the inner circumferential surface of the holding hole 100L is not formed with artificial unevenness. An outer portion of the rubber elastic body 10L and an inner portion of the holding hole 100L communicate through a cut portion 101L. The stabilizer bar 903 is disposed in the holding hole 100L. The stabilizer bar 903 is inserted from an outer portion of the rubber elastic body 10L into the holding hole 100L through an opening that is formed by opening the cut portion 101L in the up-down direction. Both left and right edges of the rubber elastic body 10L are formed with a pair of flange portions 104L. The pair of flange portions 104L has a U-shaped configuration that opens upward.

The coating film 11L has a cylindrical shape. The coating film 11L covers the inner circumferential surface of the holding hole 100L. The coating film 11L has a thickness (radial thickness) of approximately 20 μm. The lubricating film 12L is in liquid form and covers the surface (inner circumferential surface) of the coating film 11L. The surface of the lubricating film 12L (the surface of the coating film 11L if the lubricating film 12L is insufficient) is in contact with the outer circumferential surface of the stabilizer bar 903.

[Stabilizer Bushing Material]

Figure 18:
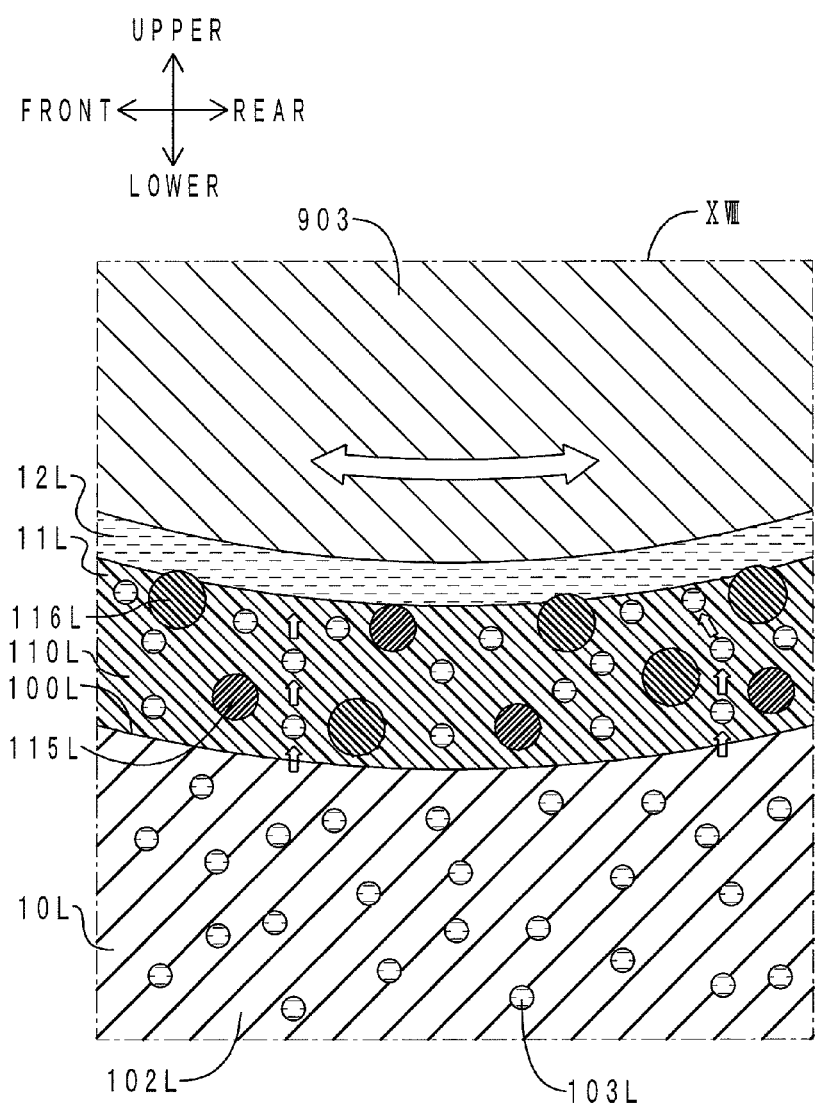
FIG. 18 is an enlarged view of the inside of a frame XVIII in FIG. 17.

Next, the material of the stabilizer bushings 1L, 1R according to the present embodiment will be described. FIG. 18 shows an enlarged view of the inside a frame XVIII in FIG. 17. Note that FIG. 18 is a schematic diagram for explaining a function of the stabilizer bushings 1L, 1R according to the present embodiment.

The rubber elastic body 10L is made of a self-lubricating rubber. The rubber elastic body 10L includes a blended rubber (referred to simply as a "blend rubber" below) 102L of an NR and a BR, and a bleeding lubricant 103L. Two types of oleic acid amides with different melting points are used as the bleeding lubricant 103L. The blend rubber 102L is included in an elastomer of the present invention.

The coating film 11L includes a silicone resin 110L having a mercapto group, the PTFE particles 115L, and the UHPE particles 116L. The PTFE particle 115L has a generally spherical shape with an average particle diameter of approximately 0.5 μm. The UHPE particle 116L has a generally spherical shape with an average particle diameter of approximately 1 μm. The mass-average molecular weight of UHPE is 2 million. A total amount of the PTFE particles 115L and the UHPE particles 116L (solid lubricant) to be contained is 30 parts by mass per 100 parts by mass of the silicone resin 110L. A percentage of the UHPE particles 116L constituting the solid lubricant is 70% by mass if the total mass of the PTFE particles 115L and the UHPE particles 116L is defined as 100% by mass.

The lubricating film 12L is formed of the bleeding lubricant (oleic acid amide) 103L of the rubber elastic body 10L. That is, as white arrows in FIG. 18 show, the bleeding lubricant 103L of the rubber elastic body 10L penetrates the coating film 11L. The bleeding lubricant 103L then oozes onto the surface of the coating film 11L. The lubricating film 12L is thus formed of the oozed bleeding lubricant 103L.

As shown by the white double-ended arrow in FIG. 18, the stabilizer bar 903 twists around an axis in accordance with the behavior of the vehicle 9. Meanwhile, the stabilizer bushing 1L is fixed to the body of the vehicle 9 through the bracket 2L that will be described later. Therefore, the surface of the lubricating film 12L (the surface of the coating film 11L if the lubricating film 12L is insufficient) is relatively in sliding contact with the outer circumferential surface of the stabilizer bar 903.

[Bracket Structure]

Next, the structure of the brackets 2L, 2R according to the present embodiment will be described. The two left and right brackets 2L, 2R have identical structures. The structure of the left bracket 2L will be explained below and this description also serves to explain the structure of the right bracket 2R. As shown in FIGS. 15 to 17, the bracket 2L of the present embodiment is made of steel and includes a bushing support portion 20L, and a pair of fixing portions 21L.

The bushing support portion 20L has a U-shaped configuration that opens upward when viewed from the left or right direction. Both left and right edges of the bushing support portion 20L are formed with a pair of flange portions 200L. A portion between the pair of flange portions 104L of the stabilizer bushing 1L is accommodated in an inner portion of the U-shaped opening of the bushing support portion 20L. The inner sides of the pair of flange portions 104L contact the pair of flange portions 200L in the left-right direction. Through such contact, separation of the stabilizer bushing 1L from the bracket 2L in the left-right direction can be suppressed.

The pair of fixing portions 21L has a rectangular plate configuration. The pair of fixing portions 21L continues from both ends of the U-shaped bushing support portion 20L. A bolt insertion hole 210L is provided in each of the fixing portions 21L. A bolt 211L is inserted into each of bolt insertion holes 210L from below. Meanwhile, a recess portion 950L and a pair of bolt securing holes 951L are disposed on the lower surface of a body 95 of the vehicle 9. The internal space of the recess portion 950L has a rectangular parallelepiped shape. The upper portion of the stabilizer bushing 1L is inserted into the recess portion 950L. The pair of bolt securing holes 951L is arranged in the front-rear direction of the recess portion 950L. The bolt 211L passes through the bolt insertion hole 210L and is threadedly fastened in the bolt securing hole 951L. Thus, the bracket 2L is fixed to the lower surface of the body 95 by the pair of bolts 211L. In addition, the stabilizer bushing 1L is held and fixed between the bracket 2L and the lower surface of the body 95. During such fixing, the upper portion of the rubber elastic body 10L is compressed and deformed by a fastening amount S (see FIGS. 15 and 16). Through the fastening amount S, the stabilizer bushing 1L is in press-contact with the outer circumferential surface of the stabilizer bar 903.

[Stabilizer Bushing Production Method]

The production method of the stabilizer bushings 1L, 1R according to the present embodiment includes a composition preparation process, a cross-linking process, a degreasing process, a coating process, and a baking process. The production method of the stabilizer bushings 1L, 1R according to the present embodiment is the same as the production method of the stopper according to the first embodiment except that it is not necessary to insert the circular disc 30R (see FIG. 2) into a cavity in the cross-linking process. Thus, a description of the production method will not be included here.

[Operation and Effects]

Next, the operation and effects of the stabilizer bushings 1L, 1R and the production method thereof according to the present embodiment will be described. With respect to portions with common structures, the stabilizer bushings 1L, 1R and the production method thereof according to the present embodiment have the same operation and effects as the stopper and the production method thereof according to the first embodiment.

That is, the lubricating film 12L of the stabilizer bushings 1L, 1R according to the present embodiment is in sliding contact with the stabilizer bar 903. In addition, for example, if the sliding surface has a portion without a sufficient lubricating film 12L due to a temporary lack of the lubricating film 12L or the like, the coating film 11L is exposed from the portion and in sliding contact with the stabilizer bar 903. In other words, even if the lubricating film 12L is insufficient, the coating film 11L is in sliding contact with the stabilizer bar 903. The coating film 11L contains the bleeding lubricant 103L oozed out of the rubber elastic body 10L, the PTFE particles 115L, and the UHPE particles 116L. Thus, the friction resistance between the coating film 11L and the stabilizer bar 903 is low. In addition, the wear resistance of the coating film 11L is high.

Fourth Embodiment

A stabilizer bushing of the present embodiment is different from a stabilizer bushing of the third embodiment in that a coating film has minute holes. The production method of a stabilizer bushing of the present embodiment is also different from the production method of a stabilizer bushing of the third embodiment in that a minute hole forming agent is mixed in a coating material for forming a coating film. In this regard, the production method of a stabilizer bushing according to the present embodiment is the same as the production method of the stopper according to the second embodiment except that it is not necessary to insert the circular disc 30R (see FIG. 2) into a cavity in the cross-linking process. Thus, only the differences will be explained below.

Figure 19:
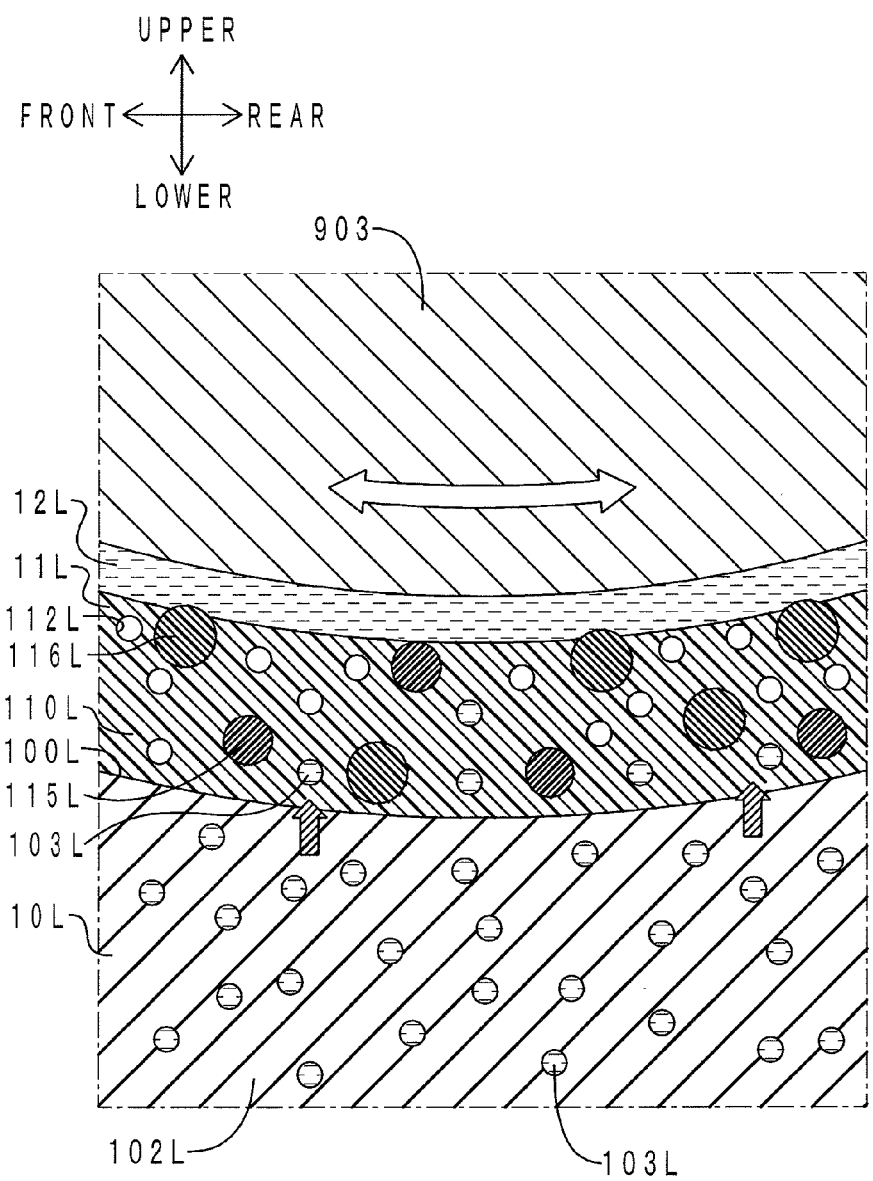
FIG. 19 is an enlarged view of the area in a stabilizer bushing according to a fourth embodiment, in which the area corresponds to the inside of the frame XVIII in FIG. 17

FIG. 19 is an enlarged view of the area in the stabilizer bushing according to the present embodiment, in which the area corresponds to the inside of the frame XVIII in FIG. 17 above. Similarly to FIG. 18, FIG. 19 is a schematic diagram for explaining the function of the stopper of the present embodiment. In FIG. 19, the region that corresponds to FIG. 18 is indicated by the same reference numeral as in FIG. 18.

The coating film 11L includes the silicone resin 110L having a mercapto group, the PTFE particles 115L, the UHPE particles 116L, and the plurality of minute holes 112L. The plurality of minute holes 112L are dispersed inside the coating film 11L. The size of the minute holes 112L is estimated to be at the level of molecules of a minute hole forming agent used to form the minute holes 112L. Some of the minute holes 112L are filled with the bleeding lubricant 103L oozed out of the rubber elastic body 10L.

The lubricating film 12L is formed of the bleeding lubricant 103L of the rubber elastic body 10L and the minute hole forming agent used to form the minute holes 112L of the coating film 11L. That is, in the production method of a stabilizer bushing according to the present embodiment, the surface of the rubber elastic body 10L is coated with a coating material containing a base material of the silicone resin 110L having a mercapto group, the PTFE particles 115L, the UHPE particles 116L, and a minute hole forming agent. The minute hole forming agent used is one (main component with a lower melting point) of the two types of oleic acid amides used as the bleeding lubricant 103L. When the coating film 11L is formed in the baking process, the minute hole forming agent in the coating material is released, and oozes onto the surface of the coating film 11L. The bleeding lubricant 103L of the rubber elastic body 10L also penetrates the coating film 11L, and oozes onto the surface of the coating film 11L. Thus, the lubricating film 12L is formed with the minute hole forming agent (oleic acid amide) and the bleeding lubricant (oleic acid amide) 103L, which has oozed onto the surface of the coating film 11L. The minute holes 112L are formed in the coating film 11L after the minute hole forming agent is released.

With respect to portions with common structures, the stabilizer bushing and the production method thereof according to the present embodiment have the same operation and effects as the stabilizer bushing and the production method thereof according to the third embodiment and the stopper and the production method thereof according to the second embodiment.

In the stabilizer bushing according to the present embodiment, the coating film 11L has the plurality of minute holes 112L. The minute holes 112L can reserve the bleeding lubricant 103L oozed out of the rubber elastic body 10L. Thus, even if the bleeding lubricant 103L in the rubber elastic body 10L oozes out faster than the bleeding lubricant 103L penetrates the coating film 11L at a high temperature, the excessive amount of the bleeding lubricant 103L is reserved in the minute holes 112L in the coating film 11L, as hatched arrows in FIG. 19 show. Consequently, the bleeding lubricant 103L is not prone to accumulate at the interface between the coating film 11L and the rubber elastic body 10L. Therefore, in the stabilizer bushing according to the present embodiment, the coating film 11L is not prone to separation from the rubber elastic body 10L even at a high temperature. Thus, the stabilizer bushing according to the present embodiment provides good durability. Further, according to the production method of the stabilizer bushing according to the present embodiment, the coating film 11L having the plurality of minute holes 112L can be relatively easily formed.

Fifth Embodiment

Stabilizer bushings according to the present embodiment are different from the stabilizer bushings according to the fourth embodiment in that a foaming agent, rather than the bleeding lubricant, is used as the minute hole forming agent for the coating film in producing the stabilizer bushings. Thus, only such differences will be described.

As in the fourth embodiment, the production method of the stabilizer bushings according to the present embodiment includes a composition preparation process, a cross-linking process, a degreasing process, a coating process, and a baking process. In the coating process, the surface of the rubber elastic body 10L is coated with a coating material containing a base material of the silicone resin 110L having a mercapto group, the PTFE particles 115L, the UHPE particles 116L, and a minute hole forming agent 113L. A foaming agent is used as the minute hole forming agent 113L. The foaming agent contains a main agent ("NEO-CELLBORN (registered trademark) N#100M" manufactured by Eiwa Chemical Industry Co, Ltd.) and an auxiliary agent ("CELLPASTE 101" manufactured by Eiwa Chemical Industry Co, Ltd.). The amount of the minute hole forming agent 113L is 10% by mass (5% by mass of the main agent and 5% by mass of the auxiliary agent) if the solid content of the coating material is defined as 100% by mass.

Figure 20:
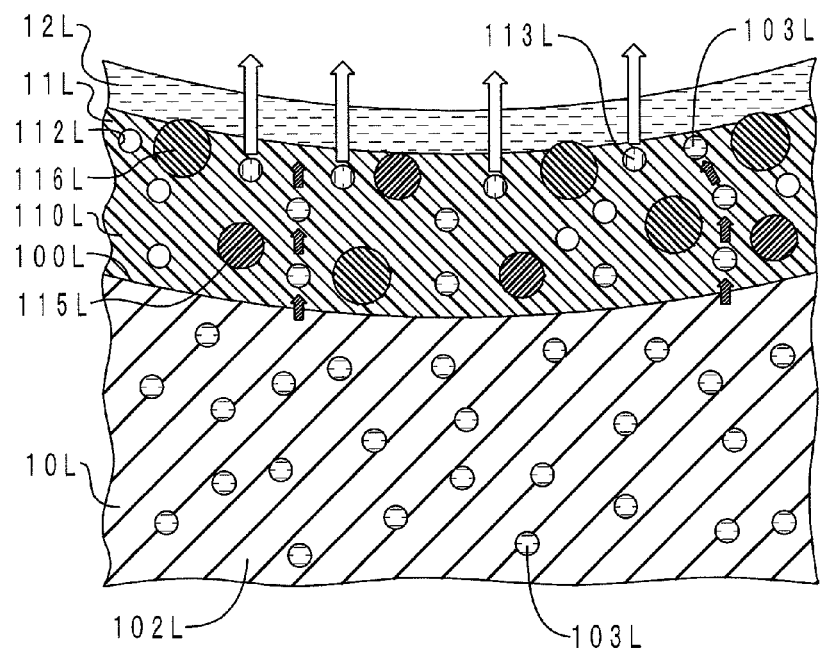
FIG. 20 is an enlarged cross-sectional view of a rubber elastic body in a baking process of a production process of a stabilizer bushing according to a fifth embodiment.

FIG. 20 shows an enlarged cross-sectional view of the rubber elastic body during the baking process. Note that FIG. 20 shows a portion corresponding to FIG. 18 mentioned earlier. In the baking process, the rubber elastic body 10L coated with the coating material is baked at 100° C. for 30 minutes. Baking thermally hardens the base material of the silicone resin 110L having a mercapto group. The coating film 11L then forms on the surface of the rubber elastic body 10L. In this event, as shown by the white long arrows in FIG. 20, the minute hole forming agent 113L in the coating material is gasified to be released from the coating film 11L. On the other hand, as hatched short arrows in FIG. 20 show, the bleeding lubricant 103L of the rubber elastic body 10L penetrates the coating film 11L to ooze onto the surface of the coating film 11L. Hence, the lubricating film 12L is formed of only the bleeding lubricant 103L that has oozed onto the surface of the coating film 11L. In addition, the minute holes 112L are formed in the coating film 11L after the minute hole forming agent 113L is released. Thus, the stabilizer bushings according to the present embodiment are produced.

In the production method of the stabilizer bushings according to the present embodiment, a foaming agent is used as the minute hole forming agent 113L. The foaming agent is gasified when baked, and released from the coating film 11L that is being cured. Thus, the minute holes 112L can be formed without hindering formation of the coating film 11L or the lubricating film 12L. Moreover, impurities are not prone to remain in the coating film 11L or the lubricating film 12L, and the performance of the coating film 11L or the lubricating film 12L is not prone to be affected. Furthermore, the amount of the minute hole forming agent 113L is 10% by mass if the solid content of the coating material is defined as 100% by mass. This makes it possible to form the minute holes 112L necessary to reserve the bleeding lubricant 103L and maintain the performance of the coating film 11L. The foaming agent is powdery. In this case, the size of the minute holes 112L can be adjusted in accordance with the particle diameter of the powder used and the foaming conditions (such as temperature).

Other Embodiments

Embodiments of the anti-vibration rubber member and the production method thereof according to the present invention were described above. However, the embodiments of the present invention are not particularly limited to the modes described above. Various modifications and improvements may also be implemented by a person having ordinary skill in the art.

For example, the elastomer of the rubber elastic body is not particularly limited in terms of material. For example, NR, BR, isoprene rubber (IR), styrene-butadiene rubber (SBR), chloroprene rubber (CR), nitrile rubber (NBR), ethylene-propylene rubber (EPDM), butyl rubber (IIR), acrylic rubber (ACM), urethane rubber (U), silicone rubber, and any blend material of these rubbers may be used.

The bleeding lubricant of the rubber elastic body is not particularly limited in terms of material. For example, a fatty acid amid (an unsaturated fatty acid amide (oleic acid amide, erucic acid amide, or the like), a saturated fatty acid amide (stearic acid amide, behenic acid amide, or the like)), a silicone oil, and a polyethylene glycol surfactant may be used.

The resin of the coating films is not particularly limited in terms of material. For example, a polyester resin, an acrylic resin, and a urethane resin may be used besides the silicone resin. In each of the embodiments above, a silicone resin was used, which has a less dense cross-linked structure than a straight silicone resin and a modified product thereof, and has rubber elasticity. A "straight silicone resin" refers to a silicone resin that includes only a methyl group, and a silicone resin that includes only a methylphenyl group. A "modified product of the straight silicone resin" includes an epoxy-modified silicone resin, an alkyd-modified silicone resin, a polyester-modified silicone resin, a silica-modified silicone resin, and an acrylic-modified silicone resin. A silicone resin that "has rubber elasticity" includes a silicone resin mixed with rubber and a silicone resin with rubber elasticity, which are used in rubber coating agents or the like.

The functional group of the resin of the coating films is not particularly limited to the mercapto group. For example, a vinyl group, an epoxy group, a methacryloxy group, and an amino group may be used. The functional group is preferably selected in accordance with the elastomer material of the rubber elastic body.

The solid lubricant contained in a coating film is not exclusively limited to PTFE particles and UHPE particles. Particles of graphite, molybdenum disulfide, fluorine resin, or the like may be used in combination with PTFE particles and UHPE particles. Examples of the fluorine resin include a tetrafluoroethylene-perfluoroalkoxy vinyl ether copolymer (PFA), a tetrafluoroethylene-hexafluoropropylene copolymer (FEP), polychlorotrifluoroethylene (PCTFE), a tetrafluoroethylene-ethylene copolymer (ETFE), a chlorotrifluoroethylene-ethylene copolymer (ECTFE), polyvinylidene fluoride (PVDF), and polyvinyl fluoride (PVF).

An amount of the solid lubricant to be contained is not limited to the embodiments above. An amount of the solid lubricant to be contained is preferably 10 parts by mass or more, and more preferably 20 parts by mass or more per 100 parts by mass of a resin. The amount of the solid lubricant to be contained is preferably 70 parts by mass or less, and more preferably 50 parts by mass or less per 100 parts by mass of a resin.

The particle diameters of the PTFE particle and the UHPE particle may be determined as appropriate in consideration of the thickness of a coating film and the like. For example, when the thickness of a coating film is about 5 μm to 30 μm, the PTFE particles having an average particle diameter from 0.5 μm to 30 μm, and the UHPE particles having an average particle diameter from 1 μm to 30 μm are preferable. The average molecular weight of UHPE is 0.5 million or more, and is preferably 1.5 million or more. The percentages of the PTFE particles and the UHPE particles to be mixed may be determined as appropriate in consideration of the friction resistance and the wear resistance of a coating film.

The minute hole forming agent is not particularly limited in terms of material. The minute hole forming agent may be such a material that is released from the coating material when baked and that is not prone to hinder formation of the coating film or the lubricating film. In the case where the minute hole forming agent contains the same component as the bleeding lubricant of the rubber elastic body as in the second and fourth embodiments described above, the lubricating film which affects the rubber elastic body to a small degree and which is stable can be formed. Moreover, because impurities are not prone to remain, the performance of the coating film or the lubricating film is not prone to be affected. Furthermore, the moving speed of the bleeding lubricant differs in accordance with the material of the matrix (the resin of the coating film and the elastomer of the rubber elastic body). Therefore, the release speed of the minute hole forming agent can be controlled in accordance with the choice of the resin, for example.

The baking temperature and the baking time in the baking process are not particularly limited. The baking temperature and the baking time may be determined as appropriate in consideration of the type of the resin, the release speed of the minute hole forming agent, the oozing speed of the bleeding lubricant, and so forth.

The size, the proportion in volume, and so forth of the minute holes formed in the coating film are also not particularly limited. Such values may be determined as appropriate in consideration of the balance between the function of reserving the bleeding lubricant oozed out of the rubber elastic body and the strength and the rigidity of the coating film.

In the above embodiments, the anti-vibration rubber member of the present invention is practiced as the stopper for the lower suspension arm and the stabilizer bushings. However, the anti-vibration rubber member of the present invention may also be practiced as a stopper for an engine mount such as disclosed in Japanese Patent Application Publication No. 2005-106169 (JP 2005-106169 A) and Japanese Patent Application Publication No. 2005-249062 (JP 2005-249062 A), and a stopper for a differential mount such as disclosed in Japanese Patent Application Publication No. 2008-89002 (JP 2008-89002 A) and Japanese Patent Application Publication No. 2008-95785 (JP 2008-95785 A).

[Examples]

Hereinafter, a torque measurement test performed on the anti-vibration rubber member of the present invention will be described.

<Sample>

The stabilizer bushing according to the fourth embodiment (see FIG. 19 above) was used as the sample for Example. That is, the coating film as the sample for Example contains PTFE particles and UHPE particles as a solid lubricant, and has minute holes. On the other hand, the stabilizer bushing having the coating film that contains only PTFE particles as a solid lubricant, and has minute holes was used as the sample for Reference Example. As the sample for Comparative Example, the stabilizer bushing having the coating film that contains only PTFE particles as a solid lubricant, and does not have any minute holes was used. In each of the coating films of Reference Example and Comparative Example, the amount of PTFE particles contained was 80 parts by mass per 100 parts by mass of the silicone resin. The PTFE particles used were the same as the PTFE particles contained in the sample for Example.

<Test Method>

First, each sample was fixed to a jig (equivalent to the lower surface of the body 95 of the vehicle 9 according to the third embodiment) with the bracket 2L (see FIGS. 15 to 17 above). Next, a shaft (equivalent to the stabilizer bar 903 of the third embodiment) was inserted into the holding hole 100L of each sample. Using a torque wrench, the shaft was subsequently twisted by ±15 degrees around an axis. The torque applied to the shaft was then measured. If the friction resistance between the shaft and the sample is low, the torque applied to the shaft will be small. Conversely, if the friction resistance between the shaft and the sample is high, the torque applied to the shaft will be large. With a twist of ±15 degrees counted as one twist, the shaft was subjected to one hundred thousand twists, and the torque was measured at predetermined numbers of twists.

Figure 21:
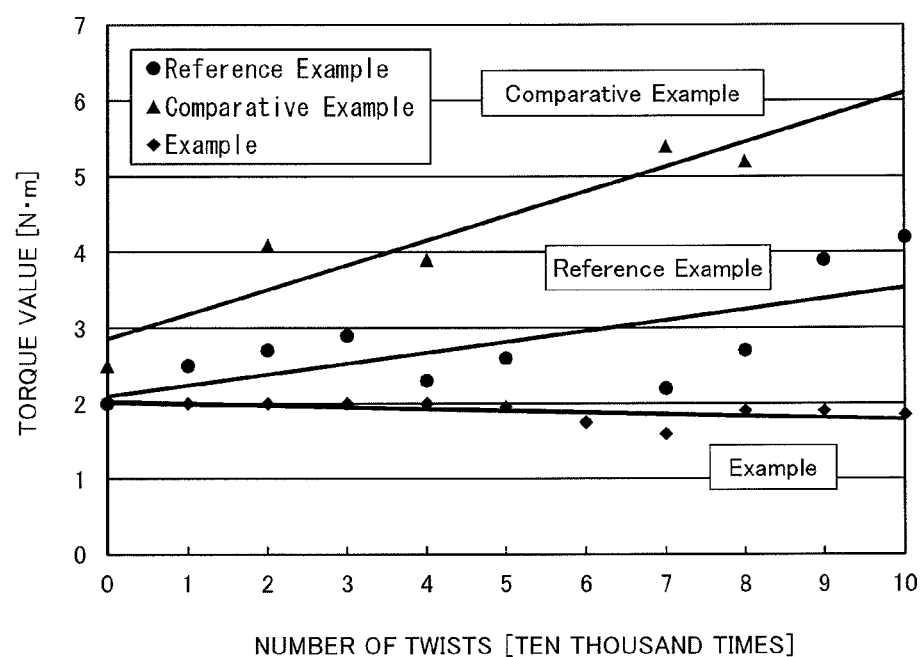
FIG. 21 is a graph showing the results of measuring torque for each sample of Example, Reference Example, and Comparative Example.

FIG. 21 shows the results of measuring the torque. For the sample of Comparative Example, as shown in FIG. 21, the torque increased as the number of twists increased. The torque increased at a lower rate for the sample of Reference Example than for the sample of Comparative Example. On the contrary, the torque hardly increased for the sample of Example even by repeated twists. That is, an increase in friction resistance between the sample and the shaft was suppressed.

In the sample of Example, the coating film has minute holes. Therefore, even if the temperature was raised by repeated twists and a large amount of the bleeding lubricant oozed out of the rubber elastic body, the excessive amount of the bleeding lubricant that could not penetrate the coating film was reserved in the minute holes in the coating film. That is, the bleeding lubricant that has oozed out was not prone to accumulate at the interface between the coating film and the rubber elastic body. Accordingly, the coating film is not prone to separation. Further, in the sample of Example, the coating film contains UHPE particles, as well as PTFE particles. Accordingly, the wear resistance of the coating film is high. Hence, the coating film is unlikely to be worn, and the rubber elastic body is unlikely to be exposed even by repeated twists. As a conclusion, in the sample of Example, it is considered that an increase in friction resistance between the sample and the shaft was suppressed.

The invention claimed is:

1. A production method of an anti-vibration rubber member that absorbs at least a portion of vibration of a mating member and has a sliding surface that is relatively in sliding contact with the mating member, the anti-vibration rubber member comprising:
a rubber elastic body that is made of a self-lubricating rubber containing an elastomer and a bleeding lubricant;
a coating film that
covers at least a portion of a sliding inner surface that is a surface of the rubber elastic body disposed on an inner side of the sliding surface,
contains a resin having at least one functional group selected from a mercapto group, a vinyl group, an epoxy group, a methacryloxy group, and an amino group, and a solid lubricant containing polytetrafluoroethylene particles and ultrahigh molecular weight polyethylene particles, and
is deformable to follow up deformation of the rubber elastic body; and
a lubricating film that covers at least a portion of a surface of the coating film, is formed by including the bleeding lubricant having penetrated the coating film from the rubber elastic body and oozing onto the surface of the coating film, and forms at least a portion of the sliding surface;
wherein the coating film has a plurality of minute holes in which the bleeding lubricant oozed out of the rubber elastic body is capable of being reserved;
the production method comprising:
creating a rubber elastic body that is made of a self-lubricating rubber containing an elastomer and a bleeding lubricant through a cross-linking reaction;
degreasing a sliding inner surface that is a surface of the rubber elastic body disposed on an inner side of the sliding surface;
coating the sliding inner surface after degreasing with a coating material that contains a thermosetting resin having at least one functional group selected from a mercapto group, a vinyl group, an epoxy group, a methacryloxy group, and an amino group, a solid lubricant containing polytetrafluoroethylene particles and ultrahigh molecular weight polyethylene particles, and a minute hole forming agent that is released when baked to form minute holes in a coating film; and
baking the rubber elastic body coated with the coating material such that the coating film is formed on the sliding inner surface while the minute hole forming agent is released from the coating material, and the bleeding lubricant of the rubber elastic body penetrates the coating film and oozes onto a surface of the coating film to form a lubricating film including the bleeding lubricant on the surface of the coating film.

2. The production method of the anti-vibration rubber member, according to claim 1, wherein
the minute hole forming agent is formed from at least one selected from a bleeding lubricant and a foaming agent.

3. The production method of the anti-vibration rubber member, according to claim 2, wherein
the minute hole forming agent includes at least one type of the bleeding lubricant contained in the rubber elastic body.

4. The production method of the anti-vibration rubber member, according to claim 1, wherein
the minute hole forming agent is formed from a bleeding lubricant, and
the lubricating film is formed from both the bleeding lubricant contained in the rubber elastic body and the minute hole forming agent.

5. The production method of the anti-vibration rubber member, according to claim 1, wherein
the amount of the minute hole forming agent is 0.5% by mass to 20% by mass when the total solid content forming the coating film is defined as 100% by mass.

* * * * *